(12) United States Patent
Rettner et al.

(10) Patent No.: US 6,975,580 B2
(45) Date of Patent: Dec. 13, 2005

(54) OPTICAL APERTURE FOR DATA RECORDING HAVING TRANSMISSION ENHANCED BY WAVEGUIDE MODE RESONANCE

(75) Inventors: Charles T. Rettner, San Jose, CA (US); Barry C. Stipe, San Jose, CA (US)

(73) Assignee: Interntional Business Machines Corporation, Armonk, NY (US)

( * ) Notice: Subject to any disclaimer, the term of this patent is extended or adjusted under 35 U.S.C. 154(b) by 715 days.

(21) Appl. No.: 10/090,589

(22) Filed: Feb. 28, 2002

(65) Prior Publication Data

US 2003/0123335 A1 Jul. 3, 2003

Related U.S. Application Data

(63) Continuation-in-part of application No. 10/026,029, filed on Dec. 18, 2001.

(51) Int. Cl.[7] .................................................. G11B 7/00
(52) U.S. Cl. ................ 369/300; 369/112.27; 369/13.56
(58) Field of Search ................................. 369/121, 122, 369/300, 119, 44.19, 112.27, 112.01, 13.56, 13.32, 112.29, 44.12, 44.23, 44.28; 385/33

(56) References Cited

U.S. PATENT DOCUMENTS

| | | | |
|---|---|---|---|
| 5,199,090 A | 3/1993 | Bell | |
| 5,555,255 A | 9/1996 | Kock et al. | |
| 5,568,504 A | 10/1996 | Kock et al. | |
| 5,583,727 A | 12/1996 | Parkin | |
| 5,625,617 A | 4/1997 | Hopkins et al. | |
| 5,689,480 A | 11/1997 | Kino | |
| 5,696,372 A | 12/1997 | Grober et al. | |
| 5,729,641 A | 3/1998 | Chandonnet et al. | |
| 5,835,458 A * | 11/1998 | Bischel et al. | 369/44.12 |
| 5,936,808 A | 8/1999 | Huang et al. | |
| 5,973,316 A | 10/1999 | Ebbesen et al. | |
| 5,986,978 A | 11/1999 | Rottmayer et al. | |
| 6,016,290 A | 1/2000 | Chen et al. | |
| 6,034,938 A * | 3/2000 | Heanue et al. | 369/13.56 |
| 6,055,220 A | 4/2000 | Mamin et al. | |
| 6,226,149 B1 | 5/2001 | Dill, Jr. et al. | |
| 6,351,447 B1 | 2/2002 | Takagi et al. | |
| 6,408,118 B1 | 6/2002 | Ahuja et al. | |
| 6,414,911 B1 * | 7/2002 | Wilde et al. | 369/13.56 |
| 6,614,960 B2 | 9/2003 | Berini | |
| 6,623,874 B2 | 9/2003 | Kanbe et al. | |
| 6,798,729 B1 * | 9/2004 | Hurst et al. | 369/119 |
| 6,850,475 B1 * | 2/2005 | Heanue et al. | 369/112.01 |
| 6,876,603 B2 | 4/2005 | Fuji et al. | |

FOREIGN PATENT DOCUMENTS

EP         1-008-870 A1        6/2000

OTHER PUBLICATIONS

H. J. Rosen et al., *Thermally–Assisted Magnetic Recording*, IBM Technical Disclosure Bulletin, vol. 40, No. 10, Oct. 1997, p. 65.

(Continued)

*Primary Examiner*—Ali Neyzari
(74) *Attorney, Agent, or Firm*—Daniel E. Johnson

(57) ABSTRACT

Electromagnetic radiation from an optical source is directed onto an optical aperture in a metallic structure. The metallic structure in turn emits optical output from an emission region in the structure and onto a recording medium (e.g., a magnetic recording disk), thereby heating the medium. The optical output is enhanced when the electromagnetic radiation from the optical source includes a frequency that matches a waveguide mode resonance in the metallic structure. Features (such as ridges or trenches) in the metallic structure may be used to further increase the emitted optical output beyond what the emitted optical output would be in the absence of these features. The apparatus and associated method are useful for data recording, e.g., thermally assisted data recording.

43 Claims, 18 Drawing Sheets

OTHER PUBLICATIONS

H. S. Gill, *Data Recording at Ultra High Density*, IBM Technical Disclosure Bulletin, vol. 39, No. 07, Jul. 1996, p. 237.

W. Wayt Gibbs, *Holey Magic*, Scientific American, Jul. 1999, p. 40.

T. Thio et al., *Strongly enhanced optical transmission through subwavelength holes in metal films*, Physica B, 279, 2000 (Elsevier Science B.V.), pp. 90–93.

E. Betzig et al., *Near-field magneto-optics and high density data storage*, Applied Physics Letters, vol. 61, No. 2, Jul. 13, 1992, pp. 142–144.

S. Astilean et al., *Light transmission through metallic channels much smaller than the wavelength*, Optics Communications, 175, 2000 (Elsevier Science B.V.), pp. 265–273.

J. J. M. Ruigrok et al., *Disk recording beyond 100 Gb/in.2: Hybrid recording?(Invited)*, Journal of Applied Physics, vol. 87, No. 9, May 1, 2000, pp. 5398–5403.

T. McDaniel, *Magneto-Optical Data Storage*, Communications of the ACM, vol. 43, No. 11, Nov. 2000., pp. 57–63.

H. Katayama et al., *New Developments in Laser-Assisted Magnetic Recording*, IEEE Transactions on Magnetics, vol. 36, No. 1, Jan. 2000, pp. 195–199.

K. E. Johnson et al., *Thin-film media– Current and future technology*, I B M Journal of Research & Development, vol. 40, No. 5, Sep. 1996, pp. 511–536.

J. Vuckovic et al., *Surface Plasmon Enhanced Light-Emitting Diode*, IEEE Journal of Quantum Electronics, vol. 36, No. 10, Oct. 2000, pp. 1131–1144.

F. Koyama et al., *Surface emitting lasers for optical near-field data storage*, SPIE Conf. on Photonics Tech. into the 21st Century, Singapore, Dec. 1999, SPIE vol. 3899, pp. 344–350.

S. Shinada et al., *Micro-Aperture Surface Emitting Laser for Near Field Optical Data Storage*, IEEE, CLEO/pacific rim 1999, ThD4, pp. 618–619.

S. Gianordoli et al., *Optimization of the emission characteristics of light emitting diodes by surface plasmons and surface waveguide modes*, Applied Physics Letters, vol. 77, No. 15, Oct. 9, 2000, pp. 2295–2297.

H. Sukeda et al., *Thermally Assisted Magnetic Recording on Flux-Detectable RE-TM media*, IEEE Transactions on Magnetics, vol. 37, No. 4, Jul. 2001, pp. 1234–1238.

M. Alex et al., *Characteristics of Thermally Assisted Magnetic Recording*, IEEE Transactions on Magnetics, vol. 37, No. 4, Jul. 2001, pp. 1244–1249.

R. Wannemacher, *Plasmon-supported transmission of light through nanometric holes in metallic thin films*, Optics Communications, 195, 2001 (Elsevier Science B.V.), pp. 107–118.

U. Schroter et al., *Surface-plasmon-enhanced transmission through metallic gratings*, Physical Review B, vol. 58, No. 23, Dec. 15, 1998, pp. 15 419–15 421.

D. E. Grupp, *Beyond the Bethe Limit: Tunable Enhanced Light Transmission Through a Single Sub-Wavelength Aperture*, Advanced Materials, vol. 11, No. 10, 1999, pp. 860–862.

Thio et al., *Surface-plasmon-enhanced transmission through hole arrays in Cr films*, Optical Society of America, vol. 16, No. 10, Oct. 1999, pp. 1743–1748.

H. A. Bethe, *Theory of Diffraction by Small Holes*, The Physical Review, Second Series, vol. 66, Nos. 7 & 8, Oct. 1 & 15, 1944, pp. 163–182.

U. Durig et al., *Near-field optical-scanning microscopy*, Journal of Applied Physics, vol. 59, No. 10, May 15, 1986, pp. 3318–3327.

T. W. Ebbesen, *Extraordinary optical transmission through sub-wavelength hole arrays*, Nature, vol. 391, Feb. 12, 1998, pp. 667–669.

J. A. Porto et al., *Transmission Resonances on Metallic Gatings with Very Narrow Slits*, Physical Review Letters, vol. 83, No. 14, Oct. 4, 1999, pp. 2845–2848.

A. Partovi et al., *High-Power laser light source for near-field optics and its application to high-density optical data storage*, Applied Physics Letters, vol. 75, No. 11, Sep. 13, 1999, pp. 1515–1517.

C. Sonnichsen et al., *Launching surface plasmons into nanoholes in metal films*, Applied Physics Letters, vol. 76, No. 2, Jan. 10, 2000, pp. 140–142.

A. V. Shchegrov, *Near-Field Spectral Effects due to Electromagnetic Surface Excitations*, Physical Reivew Letters, vol. 85, No. 7, Aug. 14, 2000, pp. 1548–1551.

D. E. Grupp, *Crucial role of metal surface in enhanced transmission through subwavelength apertures*, Applied Physics Letters, vol. 77, No. 11, Sep. 11, 2000, pp. 1569–1571.

R. Sambles, *More than transparent*, nature, vol. 391, Feb. 12, 1998, pp. 641–642.

H. F. Ghaemi, *Surface plasmons enhance optical transmission through subwavelength holes*, Physical Review B, vol. 58, No. 11, Sep. 15, 1998, pp. 6779–6782.

T. Kim et al., *Control of optical transmission through metals perforated with subwavelength hole arrays*, Optics Letters, vol. 24, No. 4, Feb. 15, 1999, pp. 256–258.

* cited by examiner

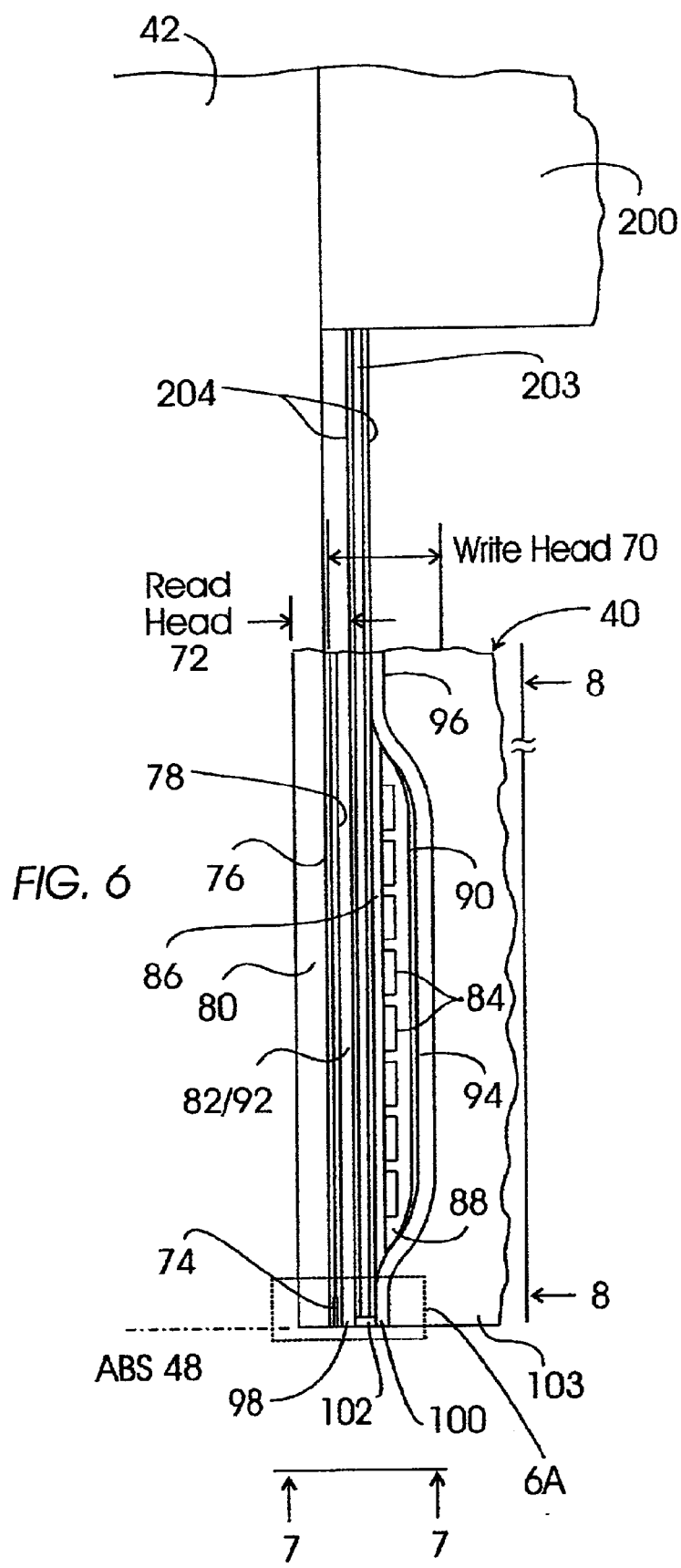

OPTICAL APERTURE FOR DATA RECORDING HAVING TRANSMISSION ENHANCED BY WAVEGUIDE MODE RESONANCE

RELATED APPLICATIONS

This application is a continuation-in-part of and claims priority to Applicant's copending application Ser. No. 10/026,029, filed Dec. 18, 2001 and entitled "Optical aperture for data recording having transmission resonance enhanced by surface plasmon resonance".

TECHNICAL FIELD

The invention relates to thermally-assisted data recording, in which a region of a recording layer (e.g., a magnetic layer) is brought to an elevated temperature as part of the data recording process, and more particularly to near-field optical techniques for accomplishing this heating.

BACKGROUND

Magnetic recording disk drives store digital information by using a thin film inductive write head. The write head is patterned on the trailing surface of a slider that also has an air-bearing surface (ABS) to allow the slider to ride on a thin film of air above the surface of the rotating disk. The write head is an inductive head with a thin film electrical coil located between the poles of a magnetic yoke. When write current is applied to the coil, the pole tips provide a localized magnetic field across a gap that magnetizes the recording layer on the disk into one of two distinct magnetic states (binary data bits).

The magnetic material used as the recording layer on the disk is chosen to have sufficient coercivity that the magnetized data bits are written precisely and retain their magnetization state until written over by new data bits. The data bits are written in a sequence of magnetization states to store binary information in the drive, and the recorded information is read back with a read head that senses stray magnetic fields generated from the recorded data bits. Magnetoresistive (MR) read heads include those based on anisotropic magnetoresistance (AMR), giant magnetoresistance (GMR), such as the spin-valve type of GMR head, and the more recently described magnetic tunnel junction (MTJ) effect. Both the write and read heads are kept in close proximity to the disk surface by the slider's ABS, which is designed so that the slider "flies" over the disk surface as the disk rotates beneath the slider.

Disk drive areal data density (the number of bits that can be recorded on a unit surface area of the disk) is now approaching the point where the grains that define data bits are so small (about 8 nanometers across) that they can be demagnetized simply from thermal agitation within the magnetized bit (the so-called "superparamagnetic" effect). The conventional approach to circumventing this problem is to increase the magneto-crystalline anisotropy and coercivity of the magnetic material in the disk's recording layer to improve the thermal stability. This has required that the write head be made with materials having increasingly high saturation moments, thereby increasing the write field of the head so it can write on the high coercivity media. However, the saturation moment is limited by the available materials. Since coercivity is temperature dependent, one proposed solution is thermally-assisted magnetic recording (TAMR), in which the magnetic material in the recording media is locally heated during the writing process so that the coercivity is reduced enough for writing to occur—at room temperature the coercivity is high enough that the recorded bits are thermally stable.

Several approaches to TAMR have been proposed, including the use of a laser beam to heat the magnetic recording layer, as described in "Data Recording at Ultra High Density", IBM Technical Disclosure Bulletin, Vol. 39, No. 7, July 1996, p. 237; "Thermally-Assisted Magnetic Recording", IBM Technical Disclosure Bulletin, Vol. 40, No. 10, October 1997, p. 65; and IBM's U.S. Pat. No. 5,583,727. A read/write head for use in a TAMR system is described in U.S. Pat. No. 5,986,978, wherein a special optical channel is fabricated adjacent to the pole or within the gap of a write head for directing laser light (or heat) down the channel. However, these technologies are generally limited to a heated spot size in the recording medium on the order of a wavelength of the light source.

Some recent scientific developments have underscored the dramatic optical behavior of metallic structures when surface electromagnetic resonances are excited. It had been thought that optical transmission through sub-wavelength apertures was exceedingly small, varying as $(d/\lambda)^4$ as first worked out theoretically by H. A. Bethe ("Theory of Diffraction by Small Holes", The Physical Review, vol. 66 (7–8), pp. 163–182, October 1944). Ebbessen et al. have described the use of sub-wavelength aperture arrays in a metal film to excite surface plasmons and enhance light transmission through the apertures. (See, for example, European Patent Application EP 1 008 870 to Ebbesen et. al., "Enhanced optical transmission apparatus utilizing metal films having apertures and periodic surface topography".) However, this work does not disclose structures useful for data recording. Other investigators have described the use of an aperture in a metal film on the face of a laser diode for producing a near-field optical spot for optical data recording. (See A. Partovi et al., "High-power laser light source for near-field optics and its application to high-density optical data storage", Applied Physics Letters, vol. 75, pp. 1515–1517, 13 Sep. 1999.) Although spot sizes of 250 nanometers were demonstrated, the absence of resonant structures is expected to result in relatively low transmission for smaller spot sizes. Other researchers have investigated transmission resonances in waveguides and their relationship to periodic boundary conditions and film thickness (see J. A. Porto et al., "Transmission resonances on metallic gratings with very narrow slits," Physical Review Letters, vol. 83, no. 14, pp. 2845–2848, Oct. 4, 1999); still others have demonstrated that surface-enhanced transmission can be obtained from an individual aperture in a metal film in the presence of bumps or divots (see D. E. Grupp et al., "Beyond the Bethe Limit: Tunable enhanced light transmission through a single sub-wavelength aperture," Adv. Mater., 1999, vol. 11, pp. 860–862). There is still a need for a high intensity light (or heat) source that can be directed to a very small region of a data recording layer.

SUMMARY OF THE INVENTION

One embodiment of the invention is an apparatus for facilitating the recording of data. The apparatus includes an optical source and a metallic structure having an optical aperture therein. The aperture has a first end and a second end, with the first end receiving optical radiation from the source and the second end emitting optical output. The structure has a transmission resonance corresponding to a waveguide mode of the aperture, in which the transmission resonance is at a frequency that matches a frequency of the optical radiation, thereby enhancing the optical output from the second end beyond what the optical output would be in the absence of the resonance. The emitted optical output includes a near-field portion that extends from the structure out to a distance less than the average wavelength of the emitted optical output. The apparatus also includes at least one element secured to the metallic structure, with said at least one element generating magnetic fields whose strength is sufficient to write data in a data recording medium located within the near-field portion. The said at least one element advantageously includes at least one poling piece for applying a magnetic field in a portion of a storage medium as the emitted optical output from the emission region heats the portion.

In a preferred embodiment, the optical aperture extends through the structure; the optical aperture is preferably a slit filled with dielectric material. In a preferred embodiment, the dimensions of the aperture are selected to enhance the transmission of the optical radiation at a predetermined frequency. The length of the aperture along an optical axis thereof is preferably about ¼–½ that of the average wavelength of the optical radiation from the source, and the aperture preferably has a spatial dimension that is less than ½ that of the average wavelength of the optical radiation from the source. The optical radiation from the source may advantageously have a fall width half maximum (FWHM) of less than about 0.1 times the average wavelength of the optical radiation.

In one preferred embodiment, there is provided a platform (e.g., a slider having an air-bearing surface) to which the structure and said at least one element are secured, in which the platform is configured to be moved relative to a data recording medium while the separation between the structure and a surface of the data recording medium is kept to less than the average wavelength. This separation is advantageously no greater than the near-field distance. The metallic structure preferably includes metal selected from the group consisting of Au, Ag, Cu, Al, and Cr. In a preferred embodiment, the structure includes at least one feature on each of opposite sides of the aperture, with the features enhancing the optical output from the structure. In one preferred embodiment, the features include variations in the thickness of the structure.

In one aspect of the invention, there is provided a method of directing electromagnetic radiation onto a data recording medium. The method includes providing a metallic structure having an optical aperture therein, with one end of the aperture receiving optical radiation and another end of the aperture emanating optical output away from the structure, in which the structure has a transmission resonance corresponding to a waveguide mode of the aperture. The method includes directing optical radiation into the aperture at a frequency that matches the transmission resonance to enhance the optical output, and directing the optical output onto a data recording medium to facilitate the recording of data. The data is preferably readable by a processor. The method may further advantageously include applying a magnetic field to the recording medium to write data into the recording medium, and the recording medium may be heated with the optical output; the data recording medium and the metallic structure are advantageously positioned to within a wavelength of each other. In a preferred implementation of the invention, the recording medium is granular and has a grain size on the order of between 10 and 250 cubic nanometers. The recording medium may include a medium selected from the group consisting of magneto-optic, phase-change, and chemical change media.

In another aspect of the invention, there is provided a method of directing electromagnetic radiation onto a recording medium. The method includes providing a metallic structure having an optical aperture therein, in which the structure has a transmission resonance corresponding to a waveguide mode of the aperture. The method further includes directing optical radiation into the aperture at a frequency that matches the transmission resonance to enhance optical output propagating out of the aperture and away from the structure, directing the optical output onto a recording medium to heat the recording medium (thereby facilitating the recording of data), and reading back the data with a processor.

In one aspect of the invention, there is provided a method of directing optical radiation onto a data recording medium. The method includes providing a metallic structure having an optical aperture therein, with the structure having dimensions selected to support optical radiation propagating in a waveguide mode of the aperture. The method also includes resonantly coupling optical radiation into the metallic structure, in which the optical radiation includes a frequency that matches a transmission resonance of the waveguide mode, and further includes directing optical output from the structure onto the data recording medium.

Another embodiment of the invention is a laser that includes an optical gain medium through which optical radiation is amplified, and a first reflector and a second reflector disposed around the gain medium. One of the reflectors includes at least one emission region though which optical output is emitted (in which the emission region has a cross section having at least one spatial dimension no greater than an average wavelength of the optical output), as well as a metallic structure having an array of features that couple the radiation to at least one surface plasmon mode of the structure to increase the emitted optical output from the emission region beyond what the emitted optical output from the emission region would be in the absence of the features. In a preferred embodiment, the laser is secured (directly or indirectly) to a platform, in which the platform is configured to be moved relative to a data recording medium while the separation between the emission region and a surface of the data recording medium is kept to less than the average wavelength. The platform may advantageously include an air-bearing surface. In another preferred embodiment, the spacing between the features in the array is chosen to enhance the optical output from the emission region at at least one predetermined frequency. In one preferred embodiment, at least one element is secured (directly or indirectly) to the laser, with said at least one element generating magnetic fields whose strength is sufficient to write data in a data recording medium located within a near-field portion of the optical output.

Yet another embodiment of the invention is a laser that includes an optical gain medium through which optical radiation is amplified and a first reflector and a second reflector disposed around the gain medium. One of the reflectors includes a metallic structure having an optical aperture therein, in which the aperture has a first end and a second end, with the first end receiving optical radiation from the medium and the second end emitting optical output. The structure has a transmission resonance corresponding to a waveguide mode of the aperture, in which the transmission resonance is at a frequency that matches a frequency of the optical radiation, thereby enhancing the optical output from the second end beyond what the optical output would be in the absence of the resonance. In a preferred embodiment, the laser is secured (directly or indirectly) to a platform, with the platform being configured to be moved relative to a data recording medium while the separation between the structure and a surface of the data recording medium is kept to less than an average wavelength of the optical output. This platform may advantageously include an air-bearing surface. At least one element may be secured (directly or indirectly) to the laser, with this element generating magnetic fields whose strength is sufficient to write data in a data recording medium located within a near-field portion of the optical output.

Preferred embodiments and implementations of the invention may be applied to a variety of technologies that record on a rigid surface (such as magnetic, phase-change, and chemical-change).

BRIEF DESCRIPTION OF THE DRAWINGS

FIG. 6 is a partial view of the slider and magnetic head as seen in plane 6—6 of FIG. 2;

DETAILED DESCRIPTION OF THE INVENTION

Magnetic Disk Drive

Figure 1:
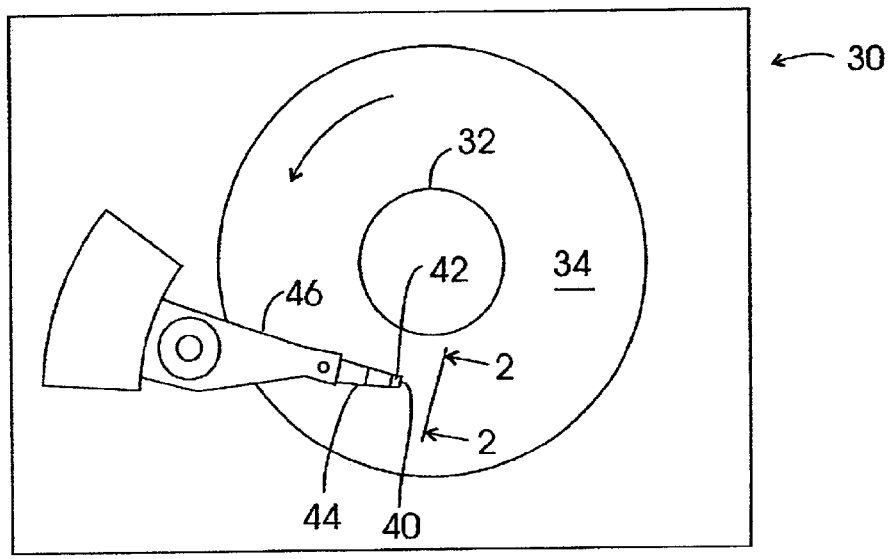
FIG. 1 is a planar view of an exemplary magnetic disk drive.
Figure 2:
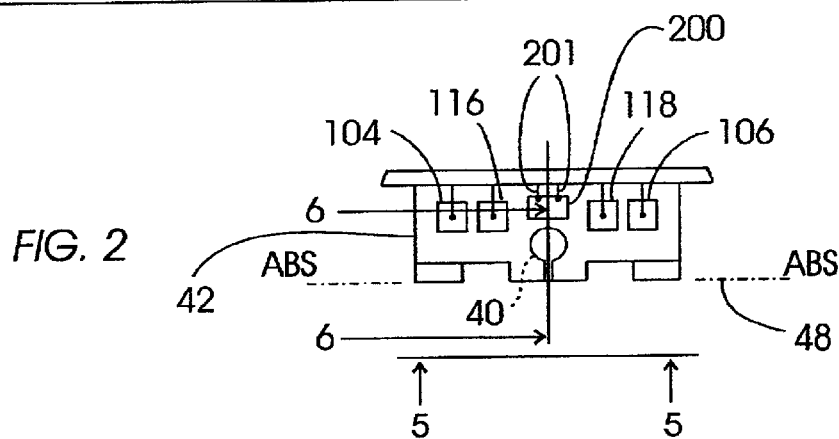
FIG. 2 is an end view of a slider with a magnetic head of the disk drive as seen in plane 2—2.
Figure 3:
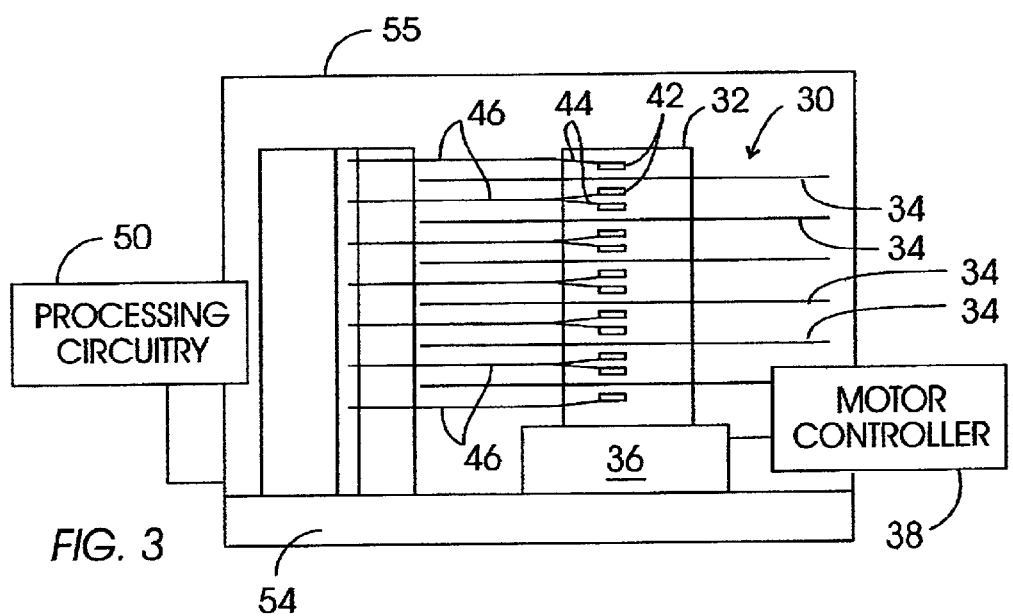
FIG. 3 is an elevation view of the magnetic disk drive wherein multiple disks and magnetic heads are employed.
Figure 4:
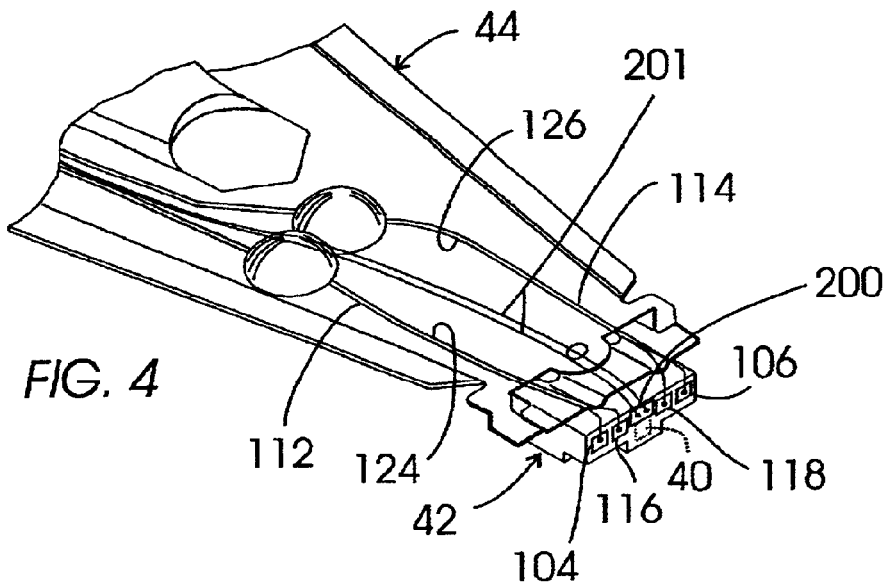
FIG. 4 is an isometric illustration of an exemplary suspension system for supporting the slider and magnetic head.

Referring now to the drawings wherein like reference numerals designate like or similar parts throughout the several views, FIGS. 1-3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36, the slider is supported on a thin (typically in the range of 5–20 nanometers, e.g., 15 nanometers) cushion of air between the surface of the disk 34 and an air bearing surface (ABS) 48 of the slider 42. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. The components described hereinabove may be mounted on a frame 54 of a housing 55, as shown in FIG. 3. In FIG. 4 the slider 42 is shown mounted to the suspension 44.

Figure 5:
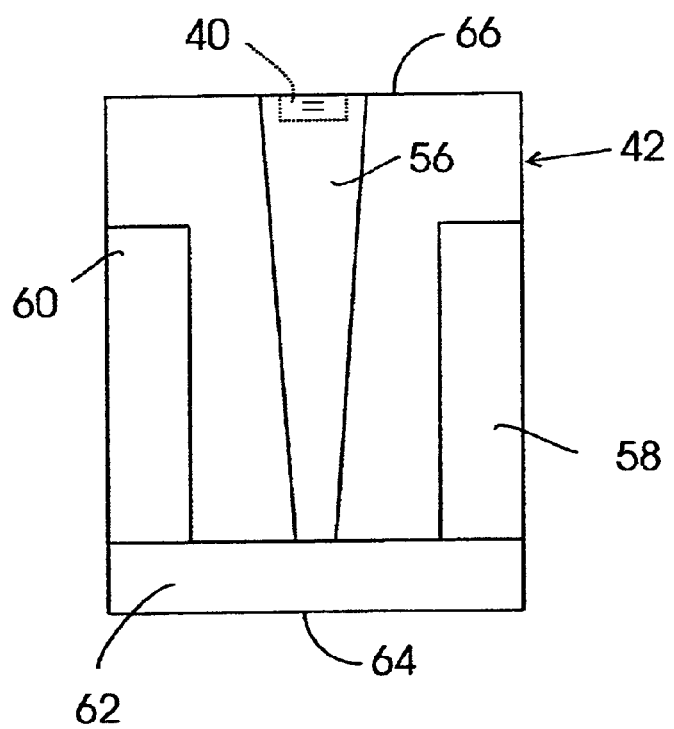
FIG. 5 is an ABS view of the slider taken along in plane 5—5 of FIG. 2.

FIG. 5 is an ABS view of the slider 42 and the magnetic head 40. (In the ABS views herein, the trailing edge is taken to be at the top of the figure.) The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of the merged MR head 40, which includes a write head portion 70 and a read head portion 72, the read head portion employing a sensor 74. FIG. 7 is an ABS view of FIG. 6. The sensor 74 is sandwiched between first and second gap layers 76 and 78, and the gap layers are sandwiched between first and second shield layers 80 and 82. In response to external magnetic fields, the resistance of the sensor 74 changes. A sense current Is conducted through the sensor causes these resistance changes to be manifested as potential changes. These potential changes are then processed as readback signals by the processing circuitry 50 shown in FIG. 3.

As shown in FIG. 6, the write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a near-field resonance element 102 at the ABS 48. The resonance element 102 (described in greater detail below) directs electromagnetic radiation onto the magnetic disk 34. The read/write head 40 may be advantageously covered with an protective overcoat layer 103 such as aluminum oxide.

Figure 8:
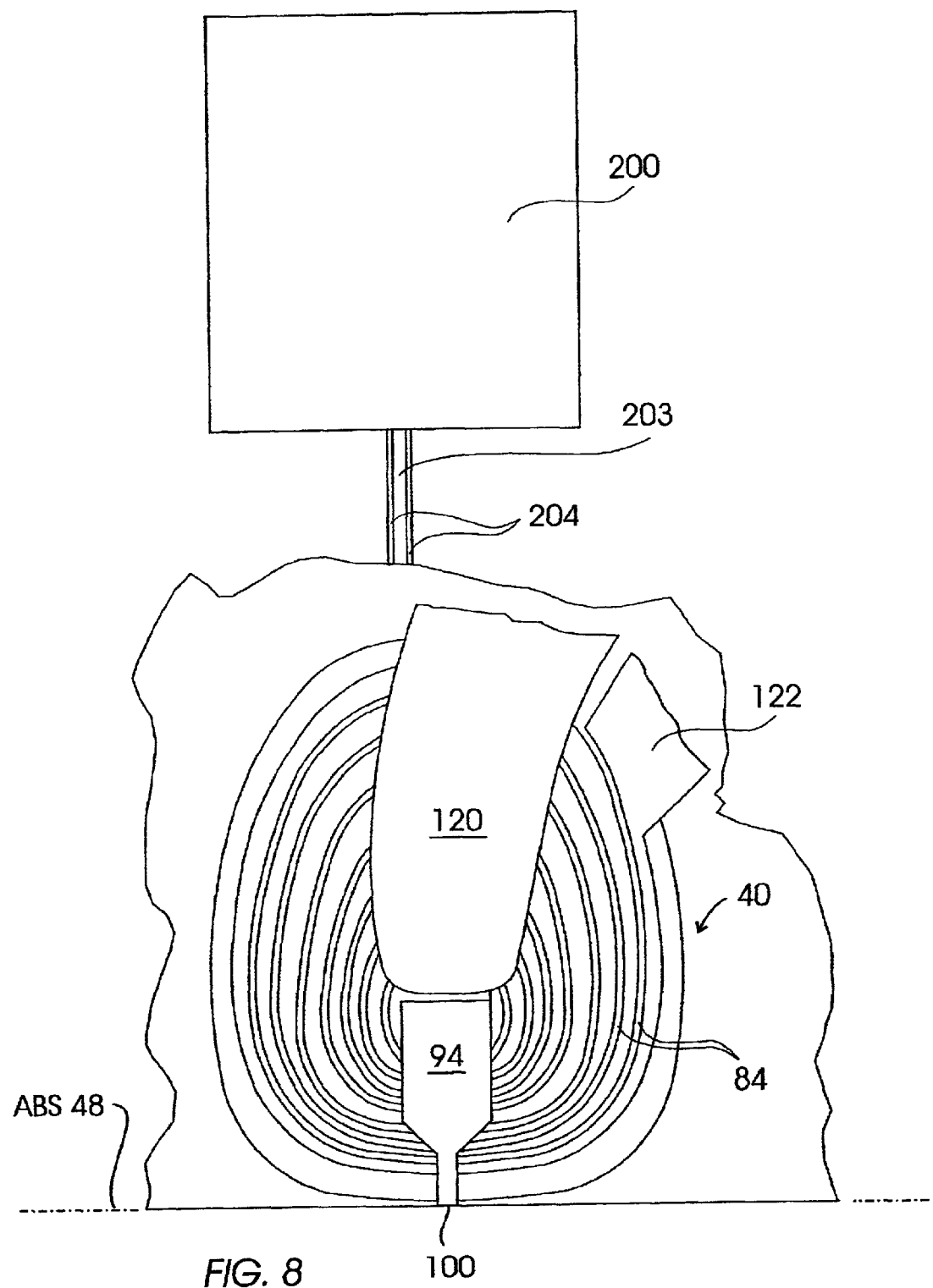
FIG. 8 is a view taken along plane 8—8 of FIG. 6 with all material above the write coil removed.

As suggested by FIGS. 2 and 4, first and second solder connections 104 and 106 connect leads (not shown) from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Preferred Embodiments Related to Waveguide Mode Resonance Enhanced Optical Transmission In FIG. 6, an optical source such as a laser diode 200 is shown secured to the slider 42. Optical output from the diode 200 is directed through a waveguide 203 surrounded by a cladding 204. The waveguide 203 and the cladding 204 (not shown in FIGS. 2 and 4 for clarity) pass through the read/write magnetic head 40 such that the optical output is directed onto the resonance element 102. FIGS. 2 and 4 show the laser diode 200 connected to leads 201, which in turn are connected to a power supply (not shown). The waveguide 203 and its cladding 204 are advantageously supported on the slider 42 and surrounded by protective material (not shown) such as alumina. Also, output from the laser diode 200 may be coupled into the waveguide 203 through a tapered optical element (not shown), such as those known to one skilled in the art.

Figure 6A:
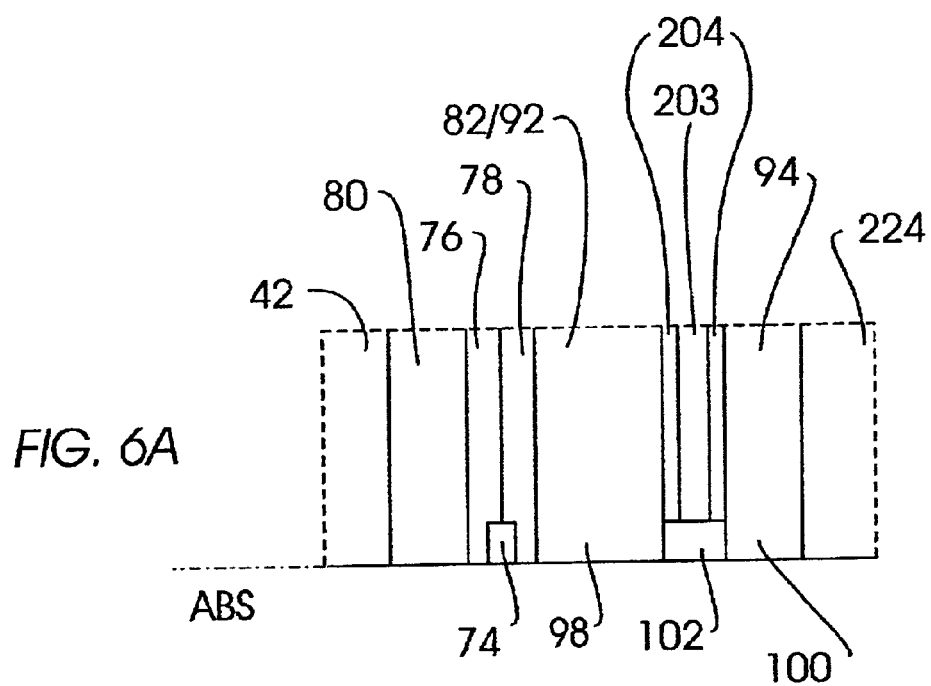
FIG. 6A is an expanded view of a portion of the device shown in FIG. 6.
Figure 7:
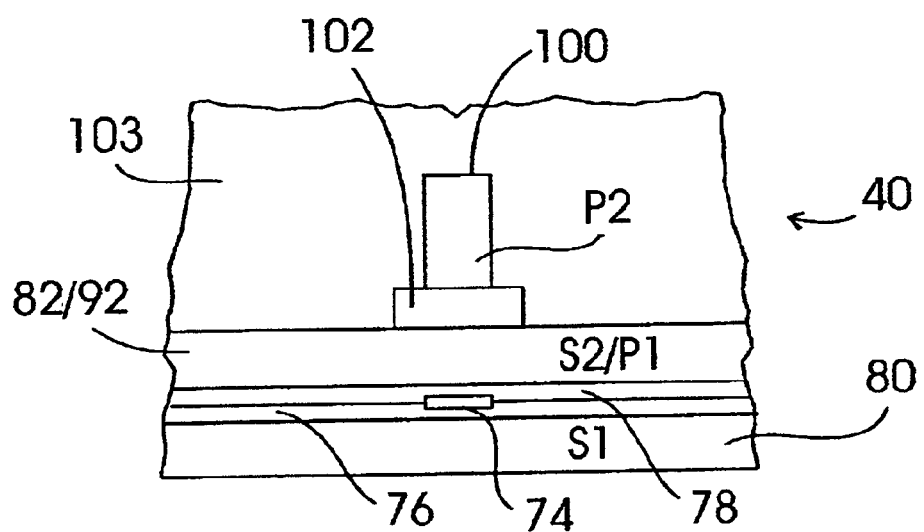
FIG. 7 is a partial ABS view of the slider taken along plane 7—7 of FIG. 6 to show the read and write elements of the magnetic head.
Figure 9A:
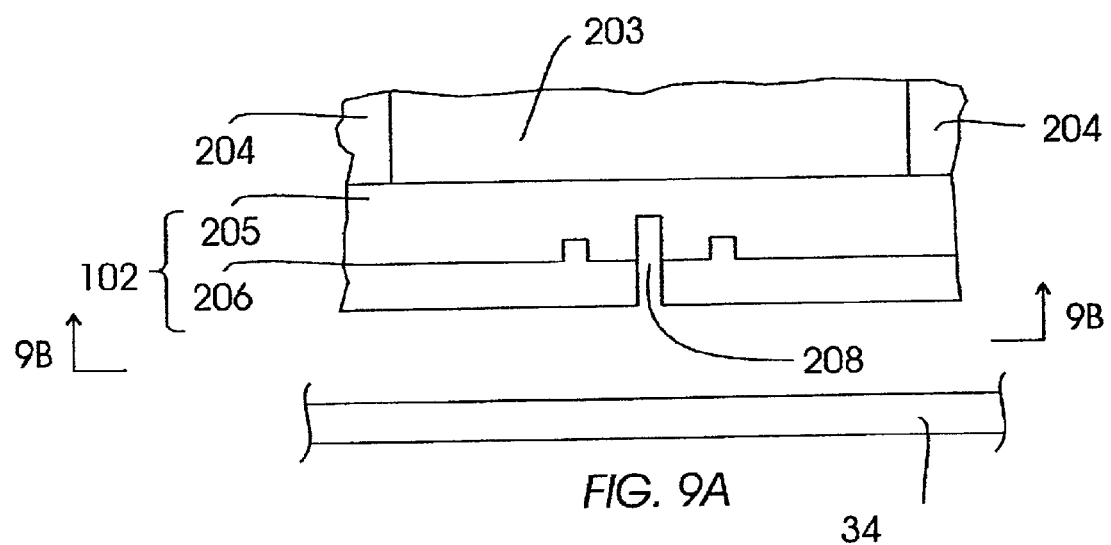
FIGS. 9A and 9B show a partial cross sectional end view and an ABS view (of the same orientation as FIG. 7), respectively, of an optical device that includes an optical resonance member having ridges in a metallic layer and an aperture through which optical radiation is emitted.

An expanded view of the resonance element 102 and the components that surround it is shown in FIG. 6A. FIG. 9A is a partial cross sectional end view of a preferred resonance element 102 showing the resonance element 102 adjoining the waveguide 203 and the cladding 204 surrounding the waveguide. The resonance element 102 shown here includes dielectric material 205 that joins the waveguide 203/cladding 204 to a metallic layer 206. The metallic layer 206 may optionally include a single ridge 207 (or alternatively, a periodic array of ridges) on both sides of an aperture 208, with the ridges protruding into the dielectric material 205. (Alternatively, the ridges can be built into the waveguide 203 without using the dielectric material 205.) The aperture 208 receives optical radiation from the waveguide 203 which is then directed onto the magnetic disk 34. The dimensions of the aperture 208 are advantageously selected so that it supports an electromagnetic waveguide mode having a transmission resonance at a desired frequency (which corresponds to a certain wavelength in air). By selecting input optical radiation at this same frequency, the optical output emitted at the ABS end of the aperture 208 is advantageously resonantly increased. As discussed in greater detail below, this waveguide mode resonance effect is different from the surface plasmon effect discussed in Applicant's copending application Ser. No. 10/026029 entitled "Optical aperture for data recording having transmission resonance enhanced by surface plasmon resonance" filed Dec. 18, 2001, which is hereby incorporated by reference.

Using the preferred embodiments herein, track widths of 10–200 nanometers, and more preferably 20–100 nanometers (which may correspond to aperture width ranges of about 5–100 nanometers and about 10–50 nanometers, respectively, when the long axis of the aperture is parallel to the tracks), may be realized by appropriately choosing the dimensions of the aperture 208. Preferred materials for the metallic layers in the optical resonance elements described herein include Au, Ag, Cu, Al, and Cr. With respect to the apertures herein, they may be optionally protected by filling them with dielectric material. In this sense the aperture 208 (as well as other apertures in the preferred embodiments described herein) may be more generally viewed as an "optical aperture" that is not necessarily an evacuated space, but that nevertheless supports a waveguide mode having a corresponding resonance.

The metallic layers in the optical resonance elements herein may advantageously have a thickness in the range of 0.25 to 0.5 that of the wavelength (in vacuum or air) of the light source, e.g., a light source whose optical emission has a wavelength in air of 650 nm could be advantageously used with a metallic layer whose thickness is in the range of 325 to 163 nm. By way of example, these metallic layers may advantageously have a thickness between 100 and 1000 nm. The optional features disclosed herein (e.g., trenches and ridges, such as ridges 207) enhance the emitted optical output from the aperture (beyond the optical output obtained due the waveguide mode resonance effect in the absence of such features) and may advantageously have lengths of 100–1000 nanometers or greater, widths (if trenches or ridges are used) of 10–150 nanometers (more preferably 20–50 nanometers, e.g., about 35 nanometers), and depths or heights of 20–300 nanometers (more preferably, 40–200 nanometers, e.g., 120 nanometers); in addition, the spacing between the aperture and its adjacent features is preferably less than 125–800 nanometers (or 150–300 nanometers, e.g., 225 nanometers). The apertures herein may advantageously have widths (at their narrowest point) in the range of 10–100 nanometers (more preferably 10–50 nanometers) and lengths (measured along the aperture's optical axis) that are long enough to prevent cutoff of the lowest order mode of the aperture, e.g., on the order of approximately 0.5 times to 0.25 times (depending on the shape of the aperture, e.g., whether the aperture has a notch) the average wavelength (in air) of the light source (e.g., 200–1000 nanometers, or 390–2000 nanometers). The dielectric layers herein may advantageously have a thickness chosen to optimize optical transmission. As used herein, the terms "light" and "optical" are intended to include visible, as well as invisible (e.g., ultraviolet and infrared) electromagnetic radiation.

Figure 9B:
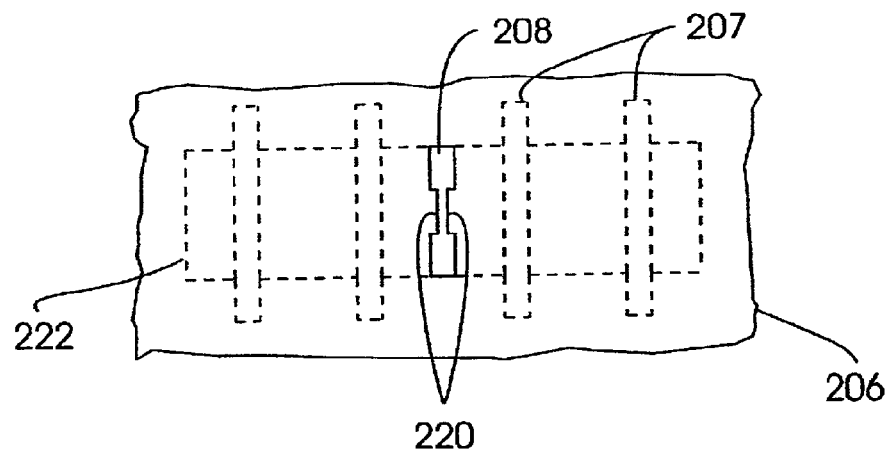

FIG. 9B shows the corresponding ABS view of the resonance element 102. The aperture 208 in the metallic layer 206 may optionally include notches 220, as shown in FIG. 9B. A notch on one or both sides of the aperture 208 serves to further narrow the track width and increase the intensity of the light due to an antenna (geometrical) effect. Since the waveguide 203, the cladding 204, and the ridges 207 are not visible when viewed from the disk 34, the ridges 207 and the waveguide/cladding interface 222 are shown here using dashed lines.

With respect to the device shown in FIGS. 6 and 6A, the various layers may be deposited using additive and subtractive lithographic techniques known to those skilled in the art. With respect to FIGS. 9A and 9B, the resonance element 102 may be advantageously constructed subsequent to the rest of the device by depositing layers onto the face of the device that becomes the air bearing surface.

Figure 9C:
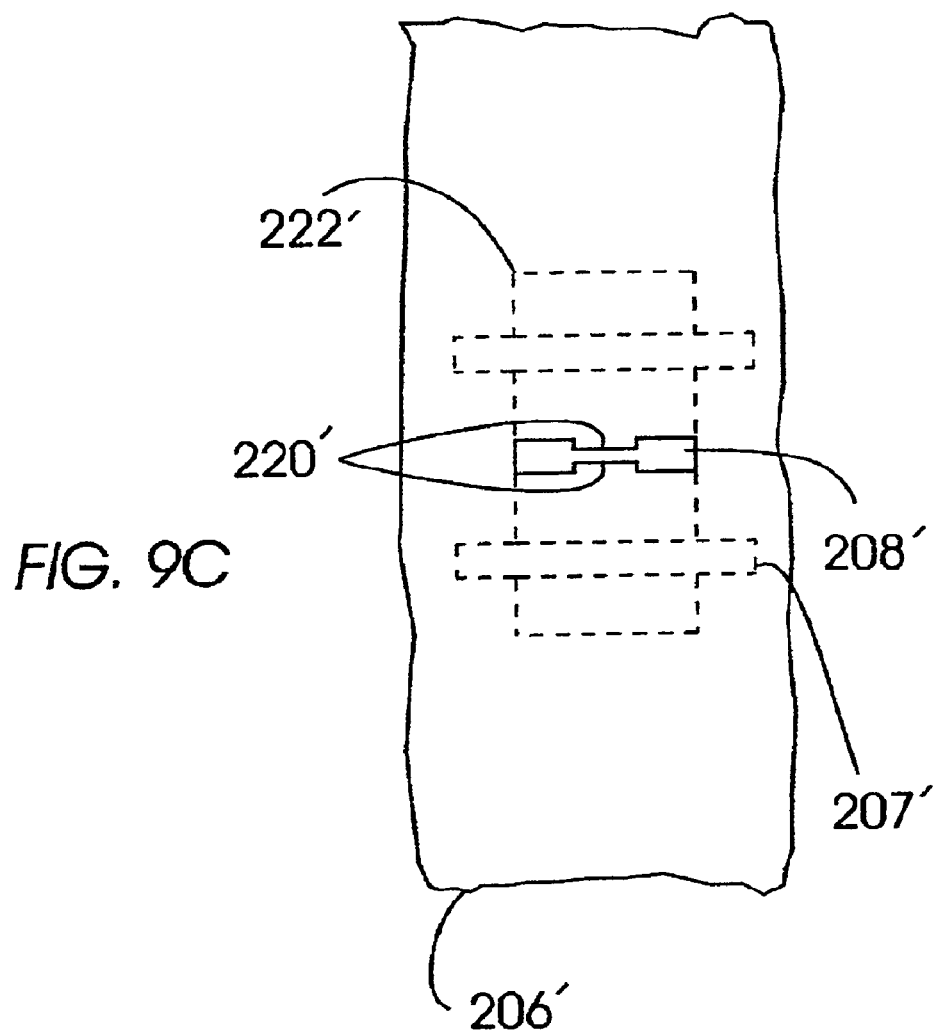
FIG. 9C is an ABS view of an optical device that includes an optical resonance ember whose elements are oriented at 90 degrees with respect those of the embodiment of FIGS. 9A and 9B.

FIG. 9C is an ABS view of an alternative embodiment that includes a metallic layer 206' having a single ridge 207' therein on each side of an optical aperture 208' (that passes through the metallic layer and includes notches 220'), as well as dielectric material separating the metallic layer from a waveguide/cladding (with the boundary between the waveguide and cladding indicated by the numeral 222'). In short, all these elements have been rotated 90 degrees with respect to their counterparts in FIG. 9B, so that they have the same orientation as the rest of the read/write structure in FIG. 6 (e.g., the first and second pole piece layers 92 and 94). In this case, the entire fabrication process may be carried out at the wafer level.

Figure 9D:
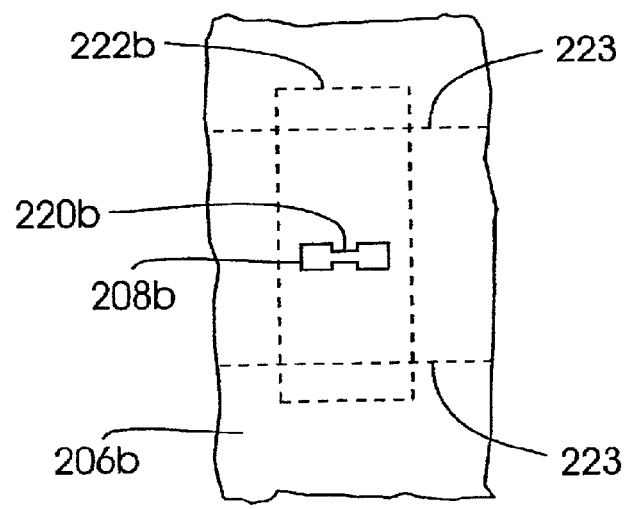
FIGS. 9D and 9E show an ABS and a partial cross sectional end view (of the same orientation of FIG. 6A), respectively, of an optical device that includes an optical resonance member having a step edge and an aperture through which optical radiation is emitted.
Figure 9E:
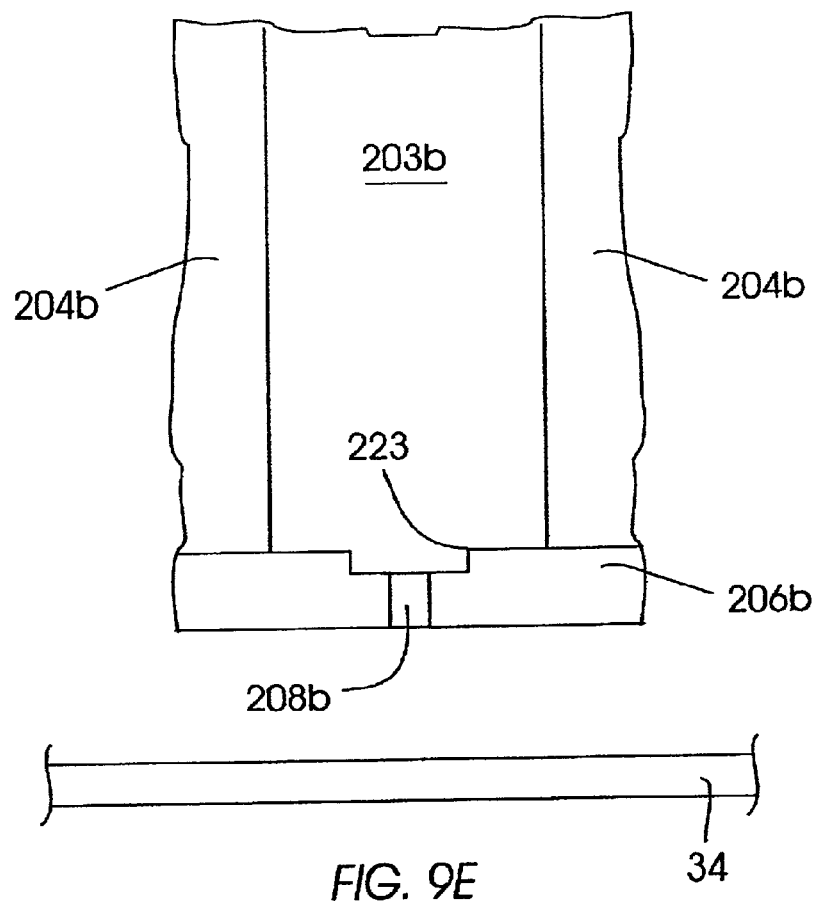

Instead of having a ridge or a trench on each side of an emission region, a step edge (i.e., a step transition in the thickness of the metallic layer) may be used. This is illustrated in FIGS. 9D and 9E, which show ABS and partial cross sectional end views of a step-edge type embodiment. A step edge 223 forms part of the contour separating a metallic layer 206b from a waveguide 203b that is surrounded by cladding 204b. (The interface between the cladding and the waveguide is denoted by the numeral 222b.) Also shown is an optical aperture 208b (illustrated here as having dielectric material therein) that has a pair of notches 220b.

Figure 9F:
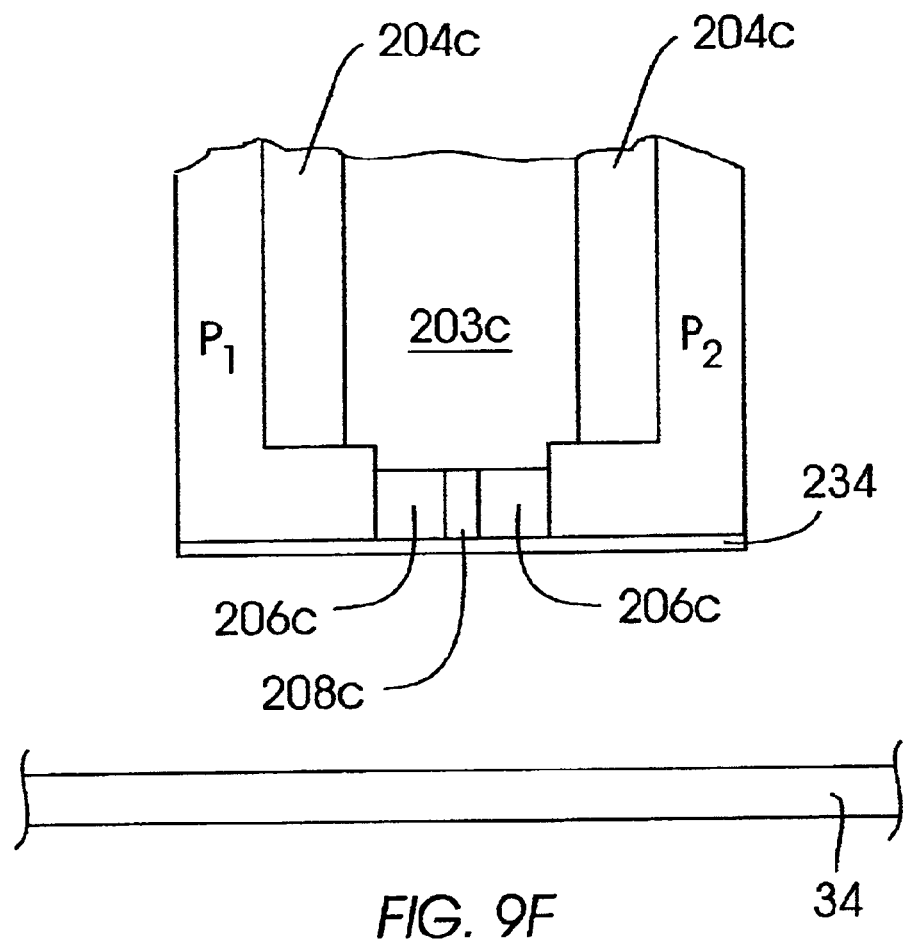
FIG. 9F shows one preferred embodiment that integrates an optical resonance member with a write head.

FIG. 9F shows a preferred way of integrating an optical resonance element with a write head. A waveguide 203c, surrounded by cladding 204c, acts as a conduit for light that is directed onto a metallic layer 206c that has an optical aperture 208c therein (with the aperture 208c shown here as having dielectric material therein). Pole pieces P1 and P2 (made of NiFeCo, for example) provide the requisite magnetic fields for writing data into the data recording medium (not shown in FIG. 9F), a process that is thermally assisted by the optical radiation emanating from the aperture 208c and onto the data recording medium. (A protective overcoat layer 234 may also be used.) The embodiment of FIG. 9F can be more generally viewed as a combination of an opaque member (in this case, a metal) having an optical emission region therein (e.g., a slit or optical aperture), with the opaque member being located between two pole pieces.

The waveguide 203 in the various embodiments herein couples light (as used herein, this term includes electromagnetic radiation outside the visible portion of the spectrum) to the optical resonance element 102. As discussed above, the light that is input into the aperture advantageously includes a significant spectral component at a frequency that matches a waveguide mode resonance supported by the aperture. (Alternatively, the frequency of the light may be tuned to match the frequency of the waveguide mode resonance, which is determined by the aperture's dimensions and the material in which it is constructed.) The effect is a frequency specific resonant enhancement of the light emitted from the distal end of the aperture (the end nearest the air bearing surface), which is then directed onto a data recording medium, with the data recording medium advantageously being positioned within the near-field of the emitted optical output. As discussed in more detail in the experimental section below, the intensity of the electromagnetic radiation directed onto the data recording medium may be still further enhanced by including features (such as ridges or trenches) about the aperture. The polarization of the light incident on the aperture is advantageously perpendicular to the orientation of the ridges 207 and the axis along the longer dimension of the aperture. It is believed that the presence of the features leads to an increase in the surface charge motion around the optical aperture, thereby increasing the re-radiation of light on the opposing surface and a very large transmission factor. The effect is largest when metals with low optical absorption are used, such as gold, silver, copper, chromium, and aluminum. Thus, the aperture 208 acts as an emission region; during writing, its distance over the disk 34 is preferably kept within a wavelength of light (more preferably to within 50 nanometers), so that an intense near-field optical field is directed onto the recording medium. As discussed in more detail below, the near-field light intensity emanating from the aperture 208 is considerably enhanced over the transmission intensity one would expect in the absence of the waveguide mode resonance. Also, the presence of the notches 220 in the aperture 208 advantageously acts to further increase the intensity of the light emanating from the aperture.

The features used herein to enhance transmission do not necessarily need to be on a particular side of the optical resonance element, and may be surrounded by one or more non-conducting materials. The individual features themselves may have any one of a number of shapes (e.g., circular, square, rectangular, elliptical, or linear), and if a lattice of features is used, the lattice may have any one of a number possible patterns (e.g., square, triangular, linear array of lines). Such a lattice may be formed by any one of a number of nanolithography techniques, including e-beam, focused ion-beam, interferometric lithography, EUV lithography, stamping, and self assembly processes.

The apertures herein (aperture 208 in FIG. 9B, for example) are substantially longer than they are wide. This geometry results in an enhancement of the optical intensity greater than that from an aperture that is, for example, square-shaped or circular (as discussed in more detail below). Additionally, the geometry of the aperture 208 is well suited for the application of magnetic recording, since the width of an aperture effectively defines the tracks in the magnetic disk 34. (Note that in the embodiment of FIG. 9C, the notches 220' help to confine the emitted optical radiation to a track that is narrower than would be obtained in the absence of notches.) The near-field radiation emanating from the aperture 208 is used to heat a track within the disk 34, followed by the writing of bits into that track. In the context of wave guide-enhanced transmission, an aperture having a shape other than a slit may be used as an emission region, e.g., the shape of the aperture may be chosen to create a desired near-field optical pattern or size, provided that the aperture can be constructed in such a way as to support a waveguide mode. Further, the size and depth of the aperture may be selected to support a particular resonance. As discussed below, the emission region itself is not necessarily limited to an aperture. A protrusion such as a sharp corner or tip on a resonant structure may form part of the emission region; the shape of the protrusion may be square, rectangular, conical, or the protrusion may include an edge designed to produce the desired shape for the optical region. Also, such a protrusion member may be offset relative to the aperture or a feature about the aperture, thereby controlling the phase of the surface resonance at the emission region.

In general, if the emission region is a slit, it may be either parallel or perpendicular to the data track direction. One advantage of a parallel orientation is very narrow track width (suitable for recording at areal densities of 1 Th/$i^2$ and higher), while a perpendicular orientation may result in less curvature to the bit shape and be easier to manufacture. In either case, the optical output emanating from the emission region is used to heat up a portion of the recording media, which when used in combination with a magnetic field orients the magnetic bit.

The in-track bit density may be determined, in part, by the field gradient produced by the magnetic pole pieces. In thermally-assisted magnetic recording, it is not necessary in general to have a large field gradient, since a large thermal gradient exists at the trailing edge of the heated area. This thermal gradient is equivalent to a large field gradient since a magnetic recording medium has a temperature dependent coercivity. Thus, it is sufficient that the pole pieces just provide a large field that can be switched at high frequency for field-modulated writing of bits at the heated region's trailing edge. Field modulated writing allows the heated region to be elongated along the track direction (from an elongated aperture or slit) and still have a high bit density along the track. Because a large field gradient is not needed, the pole pieces may be larger and may be located further away from the heated region, while still providing a sufficiently large field amplitude.

Figure 10:
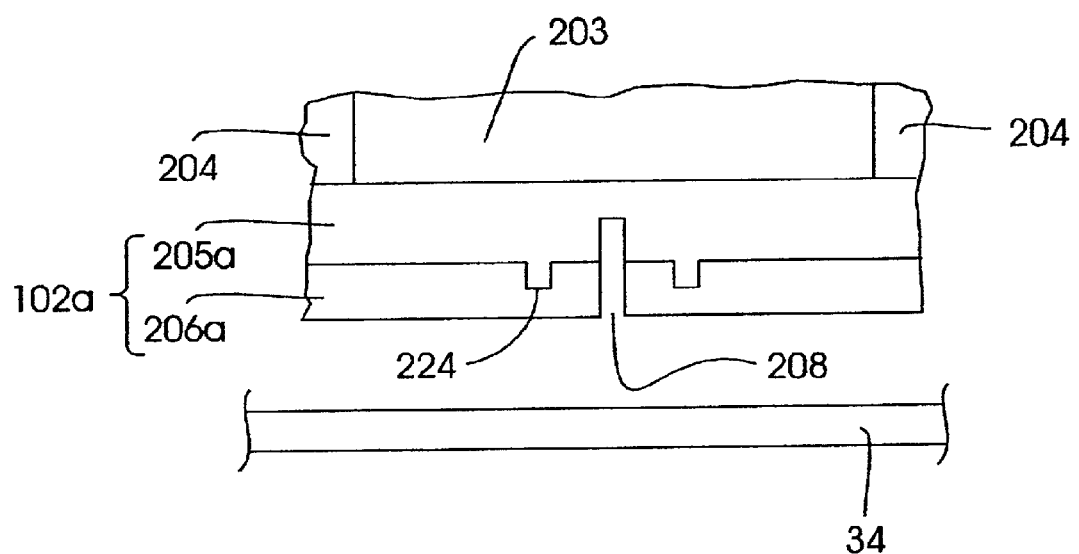
FIG. 10 shows a partial cross sectional end view (of the same orientation as FIG. 6A) of an optical device that includes an optical resonance member having trenches in a metallic layer and an aperture through which optical radiation is emitted.

FIG. 10 shows an alternative optical resonance element 102a that includes dielectric material 205a and a metallic layer 206a. The metallic layer 206a includes trenches 224 (as opposed to the ridges 207 of FIGS. 9A and 9B), but this embodiment is otherwise designed like and functions similarly to its counterpart of FIGS. 9A and 9B. (Alternatively, trenches could be built into the waveguide 203, without using the dielectric material 205a.) Optical radiation incident on the resonance element 102a is directed through the aperture 208 and onto the disk 34.

Figure 11A:
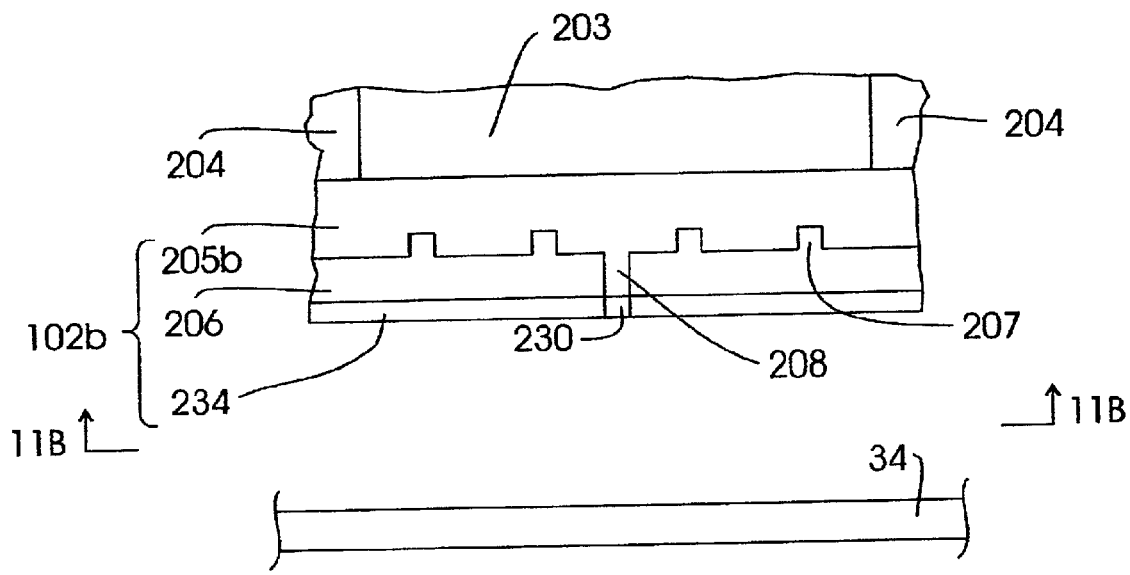
FIGS. 11A and 11B show a partial cross sectional end view and an ABS view (of the same orientation as FIG. 7), respectively, of an optical device that includes an optical resonance member having ridges in a metallic layer and a protrusion member from which optical radiation is emitted.
Figure 11B:
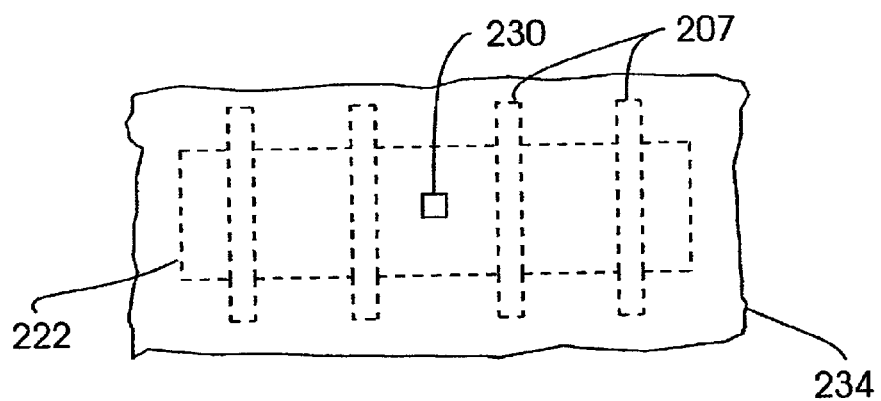

FIGS. 11A and 11B show yet another optical resonance element 102b that is similar to the resonance element 102 of FIGS. 9A and 9B, except for the presence of a metallic protrusion member 230. The embodiment of FIGS. 11A and 11B, as well as other embodiments herein, may include a protective overcoat layer 234 (e.g., carbon, carbon nitride, silicon nitride, or dielectric material). In addition, dielectric material 205b now occupies the space that previously defined the slit 208. In this embodiment, optical output emanates away from the distal end of the dielectric material 205b (near the protrusion member) with the protrusion member 230 itself acting as an optical emission member that radiates and helps direct electromagnetic radiation onto the disk 34.

Figure 12A:
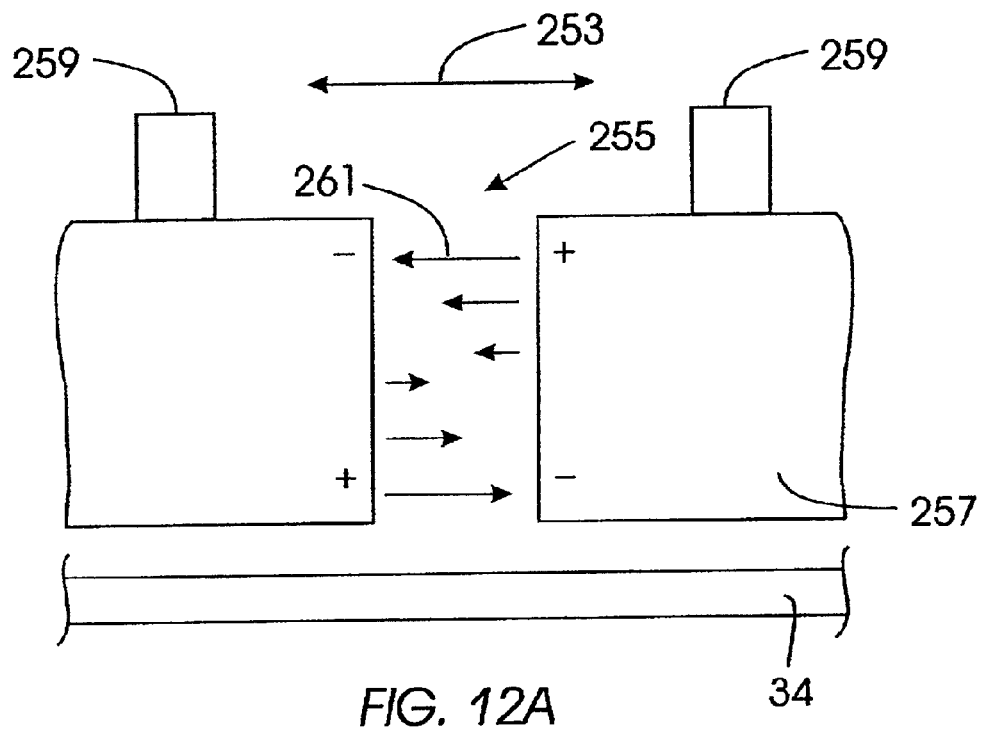
FIGS. 12A and 12B show how electric charge densities in a metallic layer (having an aperture that supports a waveguide mode resonance), as well as electric fields across the aperture, vary over time.
Figure 12B:
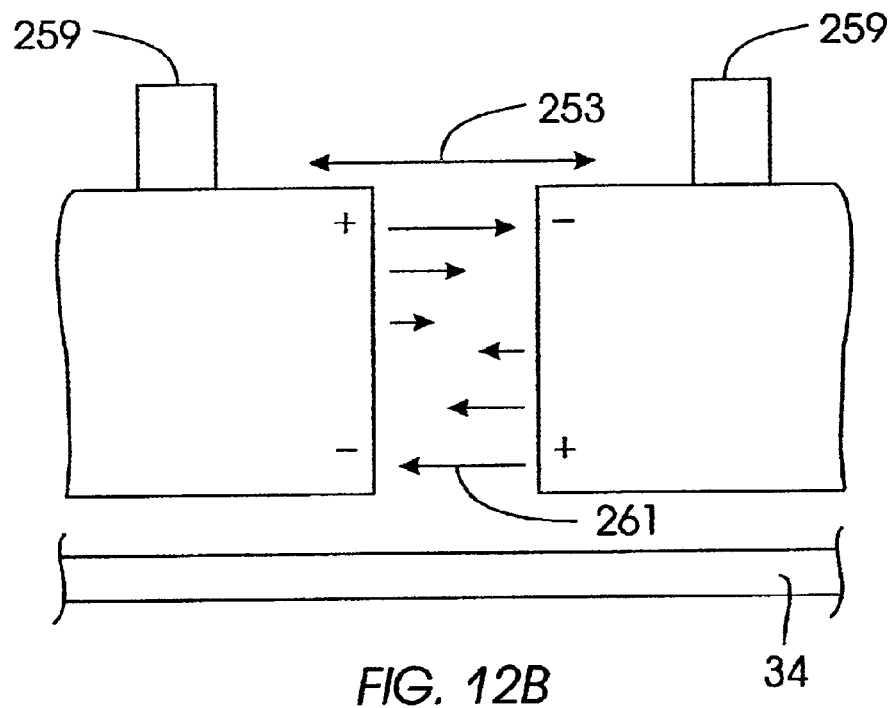

FIGS. 12A and 12B illustrate schematically how current densities are set up around an aperture. Electromagnetic radiation having a polarization indicated by the arrow 253 is incident on an aperture 255 (that may be optionally filled with dielectric material) within a metallic layer 257 having (optional) ridges 259 therein. Electric fields (as indicated by the arrows 261) are set up across the aperture 255, in accordance with the induced charge that accompanies the current flowing within the metallic layer 257 on either side of the aperture. As shown in FIG. 12B, the electric fields are reversed at some later time, as the spatial relationship between the electromagnetic plane wave and the metallic layer changes, thereby reversing the sign of the induced charge. A waveguide mode resonance occurs when the charge motion at one end of the aperture 255 has a phase opposite that of the charge motion at the other end of the aperture. The spectral position of the waveguide mode resonance depends on the thickness of the metallic layer 257 (as well as the aperture width, type of metal, and the spectral position of the surface plasmon mode when side features such as ridges or trenches are used), and the wavelength of the peak transmission (in air) is approximately 2–4 times the thickness of the metallic layer. Thus, the metallic layer 257 preferably has a thickness between c/2v and c/4v, and may vary from 130 to 650 nm, for example. (Here v is the frequency of the plane wave, and $c/v=\lambda$ when the index of refraction is equal to 1.) If ridges 259 (or trenches) are used, they may be advantageously positioned a distance from the center of the aperture 255 less than the distance used with a surface plasmon resonance embodiment (less than about c/1.5v when quartz and silver are used). Additional details regarding the physics of waveguide mode resonances are discussed in J. A. Porto et al., "Transmission resonances on metallic gratings with very narrow slits," Physical Review Letters, vol. 83, no. 14, pp. 2845–2848, Oct. 4, 1999.

Figure 13:
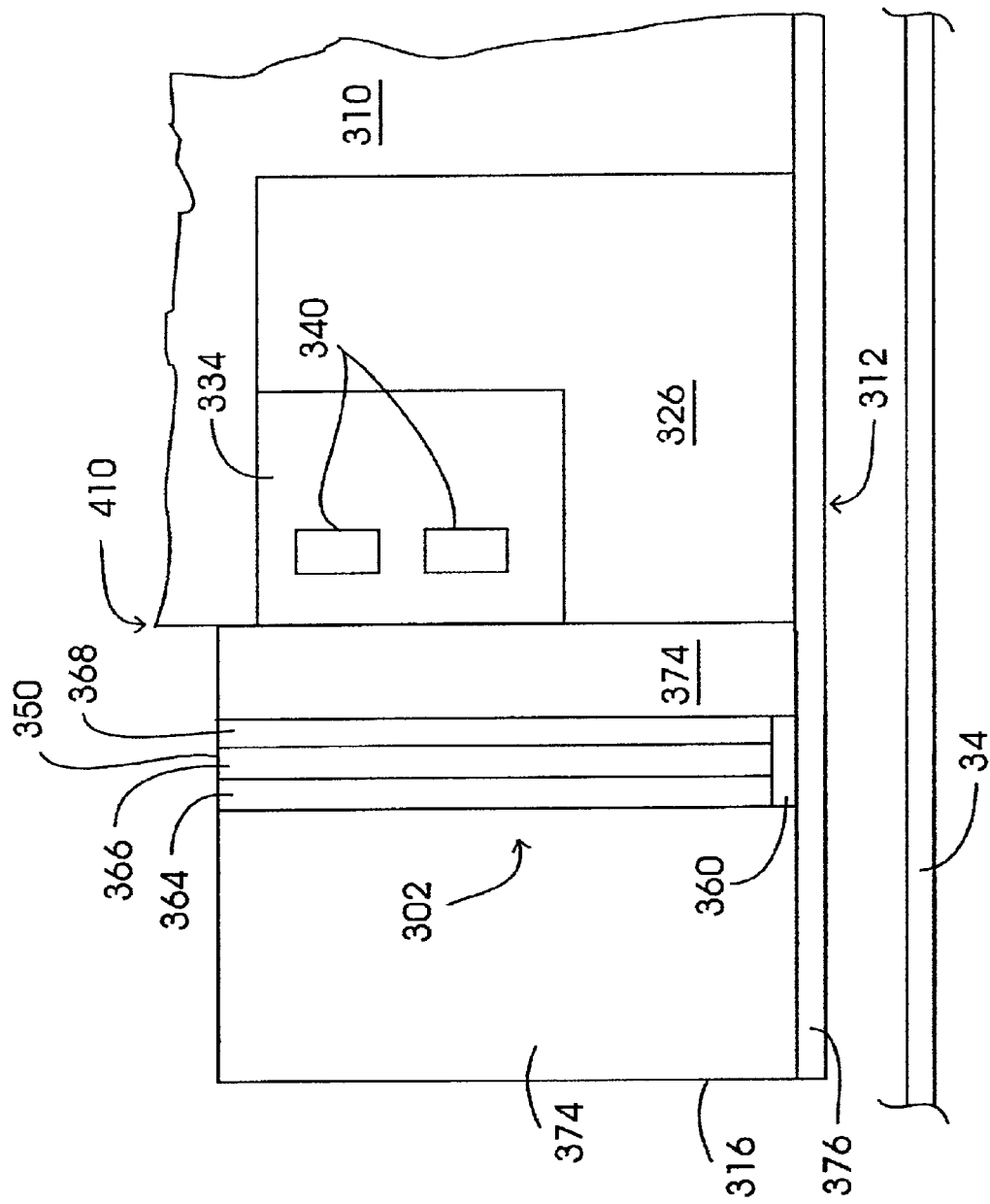
FIG. 13 is cross sectional view of an embodiment in which a light source is integrated with a slider.

FIG. 13 shows a schematic cross section of an alternative embodiment, in which a light source such as a laser diode 302 is integrated with a slider 310 having an air bearing surface 312, with the laser diode 302 being near a trailing edge 316 of the device. The laser diode 302 is located near or adjacent to both a first pole piece 326 and an insulating member 334 that surrounds coils 340 for generating a magnetic field. The laser diode 302 includes a first reflector, such as a facet 350, and a second reflector 360 at the output side of the laser diode; it further preferably includes an n-type layer 364, an active layer 366 (from which photons are emitted), and a p-type layer 368. In addition, the laser diode 302 may be advantageously secured to a substrate 374 for ease of handling. (Alternatively, the laser diode 302 may be fabricated on the same wafer as the read/write head.) Current is supplied to the laser diode 302 with electrical leads (not shown) connected to the n-type and p-type layers 364 and 368, respectively. The laser diode 302 and the mounting element 374 are preferably covered with an overcoat layer 376 made of carbon, for example. A second pole piece (not shown) may be included to enhance or tailor the write field.

Figure 14A:
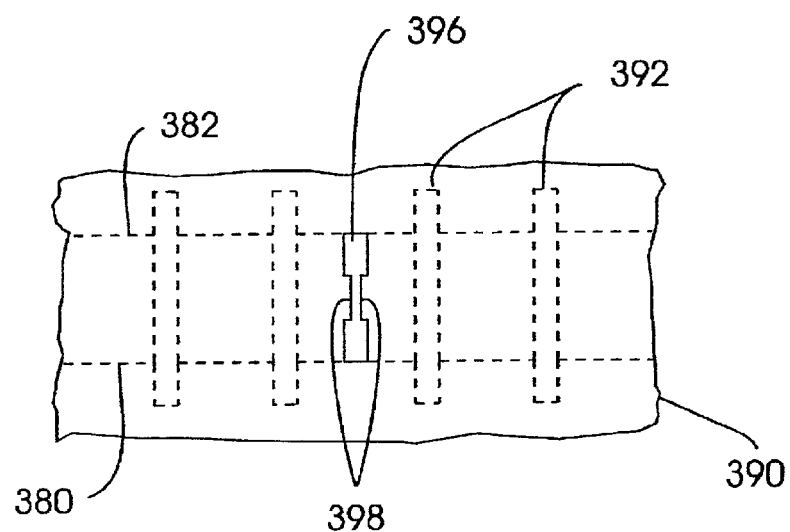
FIGS. 14A and 14B are air bearing surface and partial cross sectional views, respectively, of the optical device of FIG. 13.
Figure 14B:
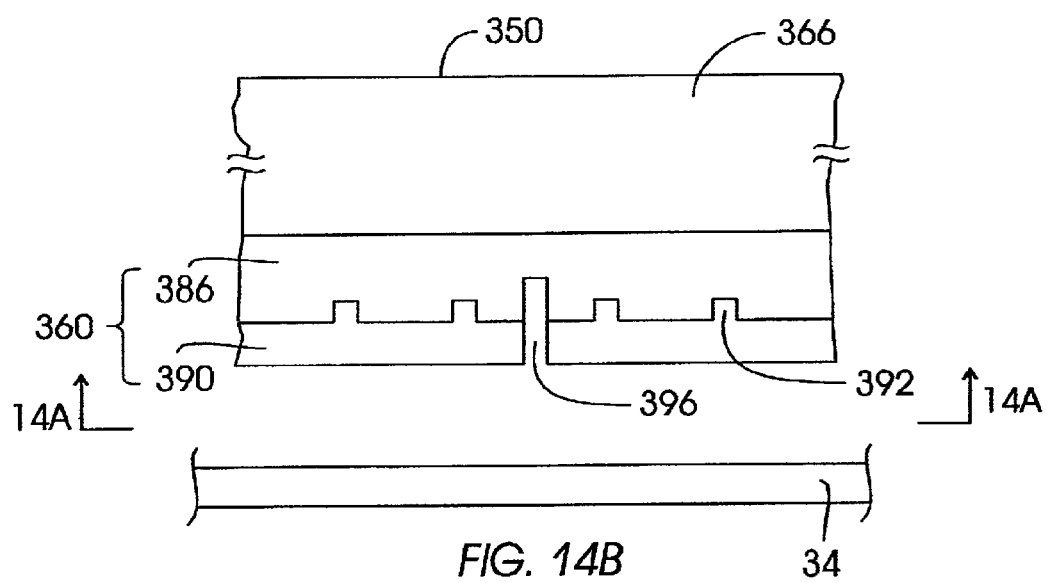

FIGS. 14A and 14B are more detailed views of the laser diode 302 of FIG. 13, with FIG. 14A showing an ABS view of the laser diode 302. FIG. 14A shows (in dashed lines) an interface 380 between the n-type layer 364 and the active layer 366, as well as an interface 382 between the p-type layer 368 and the active layer 366. The second, or output, reflector 360 here includes dielectric material 386 and a metallic layer 390 that includes ridges 392 therein. An optical aperture 396 (that may advantageously include notches 398 therein, and may be advantageously filled with dielectric material) in the output reflector emits optical radiation from laser diode 302 onto the magnetic disk 34. Thus, the second reflector 360 functions like the waveguide optical resonance elements described herein. (Alternatively, the second reflector 360 may be designed like the resonance elements described in Applicant's copending application Ser. No. 10/026029, in which surface plasmons in the metallic layer 390 act to enhance the transmission of optical radiation through the aperture 396 beyond that which would pass through the aperture in the absence of the features in the metallic layer such as the ridges 392.) The features in the second reflector 360 may include features other than the ridges 392, e.g., trenches may be used. As in other embodiments disclosed herein, during the writing process the emission region (aperture) 396 is preferably kept to within a wavelength of light of the magnetic disk 34, more preferably to within 75 nanometers, and still more preferably to within 50 nanometers, so that an intense near-field optical field is directed onto the recording medium 34.

One advantage of integrating the laser diode 302 and the slider 42 in this fashion is that optical radiation that is not directed onto the data recording medium may remain in the cavity of the diode laser 302, thereby increasing the efficiency of the laser diode. Another advantage is that the wavefront of the optical radiation within an edge-emitting laser diode has a stable polarization to excite surface plasmons and couple to an aperture.

The device of FIGS. 13 and 14A, B may be assembled by constructing the slider 310/pole piece 326/insulating member 334/coils 340 portion of the device in one set of steps, and separately constructing the laser diode 302/mounting element 374 portion of the device in another set of steps. These portions of the device may then be integrated along their common interface 410 by placing them both on an optical flat and bonding them together with conductive epoxy or conductive solder; using a conductive bonding element permits electrical connections to be made at the same time. At this point, gentle lapping of the assembled device may be necessary so that the substrate 374, laser 302, first pole piece 326, and slider 310 form a smooth, continuous surface. Before depositing the overcoat layer 376, the aperture 396 may be formed in the second reflector 360 through the use of a focused ion beam or e-beam lithography. Techniques for assembling such components are discussed in U.S. Pat. No. 5,625,617 to Hopkins et al., which is hereby incorporated by reference.

Experimental

In the experimental results that follow, the transmission of optical radiation through metallic films on quartz substrates is explored. Metallic films are discussed that function like the metallic layers in the optical resonance elements described herein, displaying transmission resonances related to a waveguide mode. In addition, resonances related to surface plasmon behavior are also observed. Which of these effects dominates at any frequency of interest depends on how the optical resonance element is constructed; an optical resonance element may be tailored for a waveguide mode or a surface plasmon resonance at a given frequency of interest.

Figure 15A:
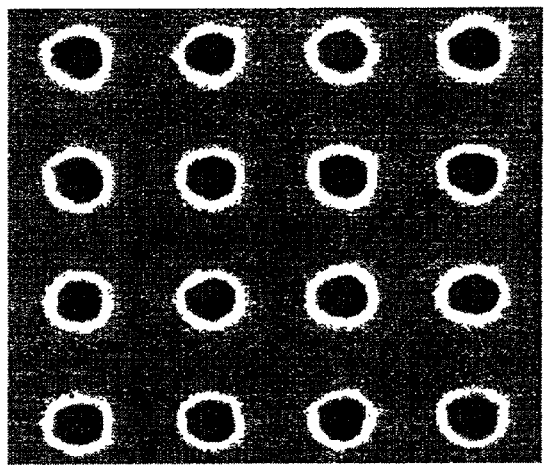
FIG. 15A is a scanning electron micrograph image of an array of holes in a silver film deposited on quartz.
Figure 15B:
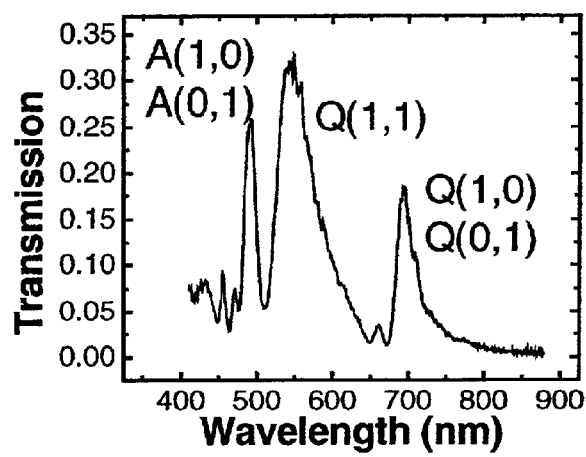
FIG. 15B shows the transmission spectrum of diffracted light (zero-order) through a structure similar to the one shown in FIG. 15A.
Figure 15C:
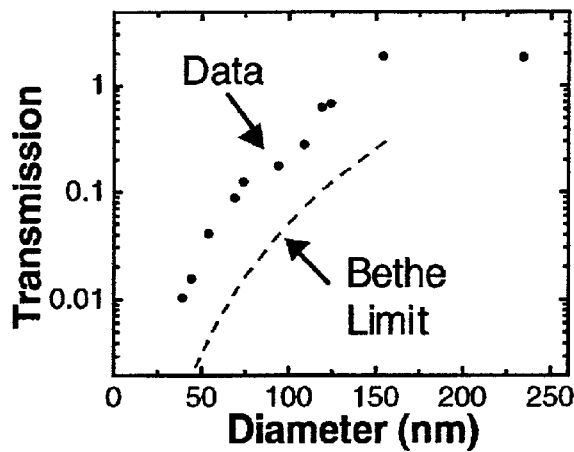
FIG. 15C shows experimental and theoretical transmission (as a function of hole diameter) for structures similar to the one shown in FIG. 15A.

FIGS. 15A and 15B illustrate surface plasmon enhanced transmission through a square array of holes. FIG. 15A shows a scanning electron micrograph image of an array of holes in a 150 nanometer thick silver film deposited on quartz (a quartz substrate was used for all the structures in FIGS. 15–18). The diameter of the holes is 155 nanometers, and the distance between the holes is 450 nanometers. These holes were formed by focused ion beam milling. FIG. 15B shows a transmission spectrum of the diffracted light (zero-order) for an array like the one shown in FIG. 15A, except that the holes have a diameter of 110 nanometers. For the data of FIG. 15B (as well as for the other transmission spectra herein), a collimated white light source was used for illumination at normal incidence while transmitted light was collected with a microscope objective, a spectrophotometer, and a liquid nitrogen cooled CCD array. In FIG. 15B, transmission is normalized to the fraction of the total area occupied by the holes. For a square array of holes, surface plasmon resonances occur at wavelengths given by $a_0(i^2+j^2)^{-1/2}(\epsilon_1\epsilon_2/\epsilon_1+\epsilon_2)^{1/2}$, in which $a_0$ is the distance between holes, i and j are integers, and $e_1$ and $e_2$ are the real components of the dielectric function of the two materials at the interface. Surface plasmon resonances occur at the air-metal, A(i,j), and quartz-metal, Q(i,j), interfaces. The three lowest frequency modes, designated A(1,0), Q(1,1), and Q(1,0), are indicated. FIG. 15C shows transmission data (normalized to the fraction of the total area occupied by the holes) as a function of hole diameter for the Q(1,1) mode. Transmission above one indicates that more light was transmitted though the holes than was incident directly on the area occupied by the holes. Also shown is the theoretical maximum Bethe transmission for an infinitely thin, perfectly conducting metal screen with a single hole (see Durig et. al., J. Appl. Phys. 59, 3318, 1986). The relatively small transmission for such small holes relative to holes larger than 150 nanometers (see Ebbesen et. al., Nature 391, 667, 1998), suggests that a 2-dimensional array of holes may not be optimum for generating intense near-field radiation for ultrahigh density data recording purposes, particularly for hole sizes below about 150 nanometers (even though the transmission is about 10 times larger than the maximum predicted by theory in the case of no surface plasmon enhanced transmission).

Figure 16A:
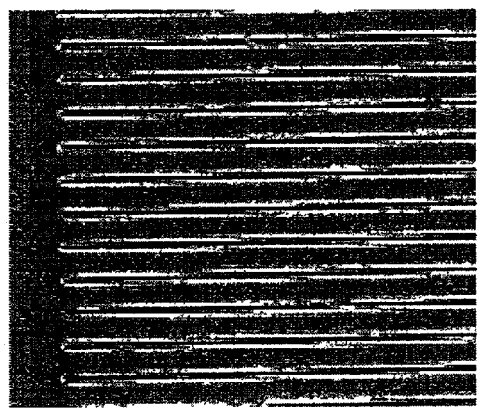
FIG. 16A shows a scanning electron micrograph image of a grating made in silver (on quartz) in which the spacing between adjacent slits is equal to 450 nanometers.
Figure 16B:
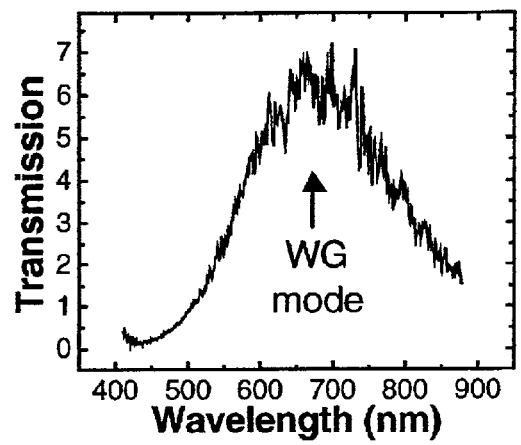
FIGS. 16B, 16C, and 16D show transmission spectra through silver gratings similar to the one shown in FIG. 16A, in which the slit spacing is 225 nanometers, 330 nanometers, and 450 nanometers, respectively, and in which surface plasmon (SP) and waveguide (WG) mode resonances are indicated.
Figure 16C:
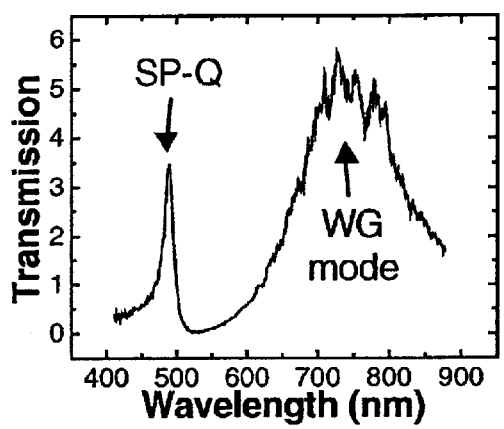
Figure 16D:
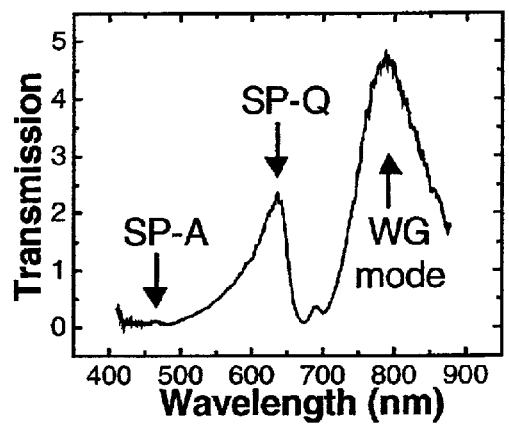

Transmission can be increased substantially using geometries other than an array of holes. FIG. 16A shows a scanning electron micrograph image of a metallic grating (225 thick silver on quartz) having a slit width of 50 nanometers and a slit spacing equal to 450 nanometers. FIGS. 16B, 16C, and 16D show zero-order transmission spectra for slit spacings of 225 nanometers, 330 nanometers, and 450 nanometers, respectively. For FIGS. 16B, 16C, and 16D, transmission is normalized to the fraction of the total area occupied by the slits. Transmission above one indicates that more light was transmitted though the slits than was incident directly on the area occupied by the slits. For these data (as well as those of FIGS. 17 and 18), the incident collimated white light used to determine transmission was polarized perpendicular to the slits with normal incidence. FIG. 16B shows experimental data for a waveguide mode transmission resonance (labeled WG in the Figures). The surface plasmon (SP) mode peak position as a function of wavelength depends linearly on the spacing between the slits according to $\lambda=a_0[\epsilon_1\epsilon_2/(\epsilon_1+\epsilon_2)]^{1/2}$, in which $a_0$ is the distance between slits. The SP mode at the air interface (SP-A) is weak relative to the SP mode at the quartz interface (SP-Q).

Figure 17:
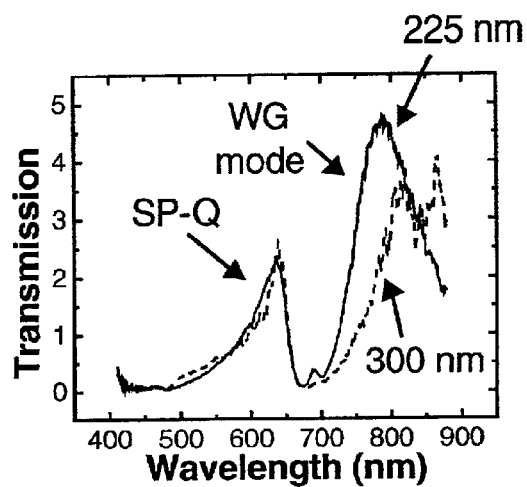
FIG. 17 shows additional transmission data through a silver (on quartz) grating (slit spacing of 450 nanometers) for film thicknesses of 225 nanometers and 300 nanometers.
Figure 17A:
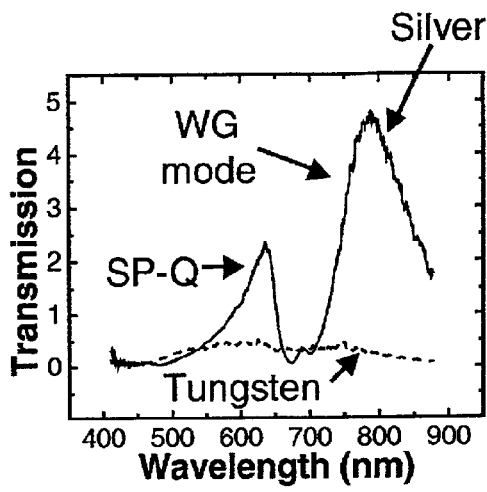
FIG. 17A shows additional transmission data through a silver (on quartz) grating (slit spacing of 450 nanometers) for a film thickness of 225 nanometers, and for comparison, data through a tungsten (on quartz) grating (slit spacing of 450 nanometers) for a film thickness of 225 nanometers.

FIG. 17 shows transmission resonance data through metallic gratings (laid out like the grating shown in FIG. 16A), having a slit width of 50 nanometers, a slit spacing of 450 nanometers, and film thicknesses of 225 and 300 nanometers. As suggested by FIG. 17, the spectral position of the waveguide mode resonance is sensitive to the film thickness, but the spectral location is relatively insensitive to film thickness in the case of surface plasmon excitation. These data suggest that when using a diode laser emitting at 780 nanometers as the optical source for thermally assisted recording, a metallic layer having 50 nm wide slits separated by about 450 nanometers would be suitable for a waveguide mode resonance. On the other hand, a surface plasmon mode would be excited at an optical frequency corresponding to 630 nm. The data of FIG. 17A show that both surface plasmon enhanced transmission and waveguide mode resonance transmission are substantially increased when using a high conductivity metal (such as Au, Ag, Al, Cr, and Cu) as opposed to a low conductivity metal (such as tungsten).

Figure 18A:
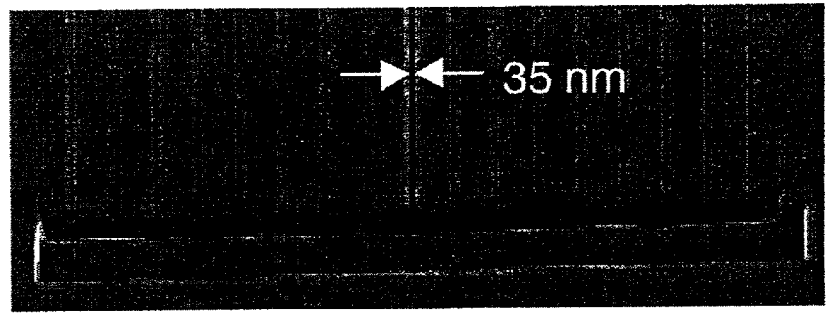
FIG. 18A is a scanning electron micrograph image of a silver (on quartz) film structure having a single slit (of width 35 nanometers) between 120 nanometer high ridges (in the metal film) separated by 450 nanometers.
Figure 18B:
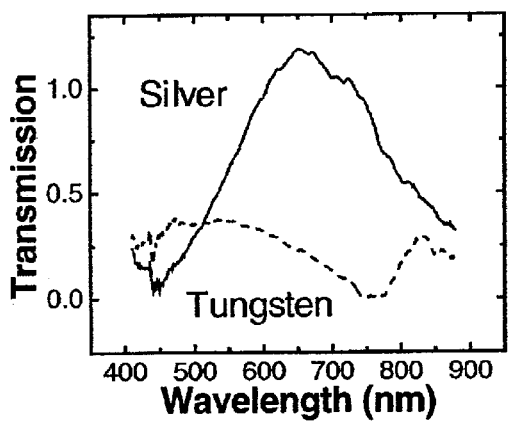
FIG. 18B shows transmission spectra for structures consisting of a single, isolated 35 nanometer wide slit in 225 nm thick silver and tungsten films (on quartz), respectively.
Figure 18C:
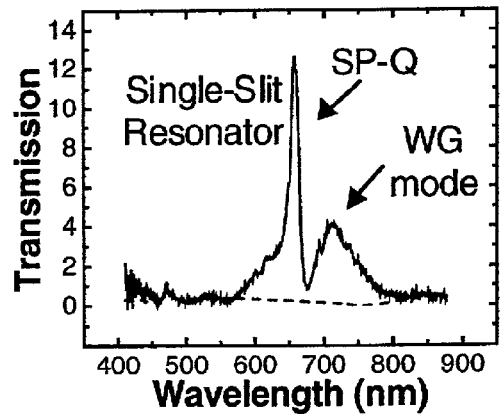
FIG. 18C shows a transmission spectrum for the structure shown in FIG. 18A.

As suggested by the data above, a waveguide mode resonance (or a surface plasmon resonance) may be generated not just with a regular array of holes or slits, but also with an array in which all but one (or more) of the holes or slits in such a regular array is replaced with raised or lowered regions in the surface of the metal film, so that the metal film includes ridges or trenches (such as in the embodiments discussed herein). FIG. 18A shows a scanning electron micrograph image of a metallic (silver) film on quartz, in which the metallic film has a single 35 nanometer wide slit or aperture (in the center of FIG. 18A) surrounded by an array of ridges. The array of ridges was formed by patterning 120 nanometer deep trenches in the quartz substrate before silver was evaporated onto it. This kind of structure has substantially greater transmission than one having a single slit without any surrounding ridges. FIG. 18B shows normalized transmission spectra for isolated single slits in 225 nanometer thick silver film and tungsten film, showing that the normalized transmission is much higher with silver than with tungsten. FIG. 18C presents the normalized transmission spectrum for the silver film of FIG. 18A, showing the waveguide (WG) mode resonance and surface plasmon (SP) resonance at the quartz interface. The transmission of an isolated slit in a film of tungsten is shown for comparison (dotted line). The data of FIGS. 18B and 18C were collected from a single slit, and accordingly, the numerical aperture of the collection optics has been taken into account when calculating the normalized transmission. Other experimental results suggest that for the waveguide mode resonance phenomena described herein, placing a single feature (e.g., ridge or trench) on each side of the aperture is just as effective in enhancing the effective transmission as using multiple features, i.e., the effective transmission through an aperture supporting a waveguide mode can be increased at the waveguide mode resonance frequency by positioning a single feature (e.g., a trench or ridge) on each side of the aperture, but employing additional features beyond this does not seem to enhance the effective transmission.

As suggested by FIG. 18C, the silver film of FIG. 18A is tailored for transmission at 650 nanometers when used in a surface plasmon mode and about 715 nm when used at a waveguide mode resonance. Thus, a laser diode at 650 or 715 nm and a silver film having a lattice constant of about 450 nanometers effectively transmit optical radiation at these wavelengths. The transmission of this device is about 60 times larger at 650 nanometers (plasmon mode) than for the isolated slit in the film of tungsten at the same wavelength, and 15 times larger at 715 nanometers (at the waveguide mode resonance) than for the isolated slit in the film of tungsten. As suggested by the fact that the normalized transmission is above one, this silver film device collects optical power over a region much larger than the slit itself and transmits the power effectively through a sub-wavelength opening. Note that the maximum transmission for this 35 nanometer slit structure (in which the transmission is approximately 10, see FIG. 18C) is approximately 1000 times larger than for the 2-dimensional array of 40 nanometer diameter holes (for which the transmission is approximately 0.01, see FIG. 15C), indicating that an emission region in the form of a slit may be advantageously used for ultrahigh density data recording.

Although the embodiments herein have been described principally with respect to waveguide mode phenomena, analogous embodiments involving surface plasmon effects can be constructed by appropriately tailoring, for example, the input optical frequency and the distance between the features around the aperture. In addition, although the recording of information has been described herein principally with respect to magnetic recording on a magnetic disk, embodiments of the invention may be used in conjunction with other kinds of recording media, such as magneto-optic, phase-change, or chemical-change, and may be caused or assisted by heating or photo-chemistry. The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. An apparatus for facilitating the recording of data, comprising:

an optical source;

a metallic structure having an optical aperture therein, said aperture having a first end and a second end, said first end receiving optical radiation from said source and said second end emitting optical output, said structure having a transmission resonance corresponding to a waveguide mode of said aperture, wherein said transmission resonance is at a frequency that matches a frequency of the optical radiation, thereby enhancing the optical output from said second end beyond what the optical output would be in the absence of said resonance, wherein the emitted optical output includes a near-field portion that extends from said structure out to a distance less than the average wavelength of the emitted optical output; and at least one element secured to said metallic structure, said at least one element generating magnetic fields whose strength is sufficient to write data in a data recording medium located within the near-field portion.

2. The apparatus of claim 1, wherein said aperture extends through said structure.

3. The apparatus of claim 1, wherein said structure includes a protrusion member that directs the optical output onto the recording medium.

4. The apparatus of claim 1, further comprising a platform to which said structure and said at least one element are secured, wherein said platform is configured to be moved relative to a data recording medium while the separation between said structure and a surface of the data recording medium is kept to less than said average wavelength.

5. The apparatus of claim 4, wherein said separation is no greater than said near-field distance.

6. The apparatus of claim 4, wherein said platform is a slider having an air-bearing surface.

7. The apparatus of claim 1, wherein said optical source comprises a laser and said emission region is located at an output face of said laser.

8. The apparatus of claim 1, wherein said optical aperture is filled with dielectric material.

9. The apparatus of claim 1, said optical source comprising an optical waveguide coupled to a source of optical radiation.

10. The apparatus of claim 1, wherein said metallic structure includes metal selected from the group consisting of Au, Ag, Cu, Al, and Cr.

11. The apparatus of claim 1, further comprising a protective coating that adjoins said metallic structure.

12. The apparatus of claim 1, said structure comprising at least one feature on each of opposite sides of said aperture, said features enhancing the optical output from said structure.

13. The apparatus of claim 12, comprising two of said features.

14. The apparatus of claim 12, said features including variations in the thickness of said structure.

15. The apparatus of claim 12, said features including a material other than a material making up the rest of said metallic structure.

16. The apparatus of claim 1, further comprising one or more dielectric coatings that adjoin said metallic structure, said one or more coatings having thicknesses selected to enhance the transmission of the optical radiation through said apparatus.

17. The apparatus of claim 1, wherein said aperture is a slit.

18. The apparatus of claim 1, wherein said aperture has a width at its narrowest point of about 10–100 nanometers.

19. The apparatus of claim 1, further comprising a protrusion member near said second end.

20. The apparatus of claim 1, said at least one element comprising at least one poling piece for applying a magnetic field in a portion of a storage medium as the emitted optical output from said emission region heats the portion.

21. The apparatus of claim 1, wherein the thickness of said metallic structure is between 100 and 1000 nanometers.

22. The apparatus of claim 1, wherein the dimensions of said aperture are selected to resonantly enhance the transmission of the optical radiation at a predetermined frequency, and wherein the emitted optical output is intense enough to heat a magnetic recording medium sufficiently to facilitate the recording of data.

23. The apparatus of claim 1, wherein the length of said aperture along an optical axis thereof is approximately ¼–½ that of the average wavelength of the optical radiation from said source.

24. The apparatus of claim 1, wherein said aperture has a spatial dimension that is less than ½ that of the average wavelength of the optical radiation from said source.

25. The apparatus of claim 1, wherein the optical radiation includes visible radiation.

26. The apparatus of claim 1, wherein the optical radiation from said source has a fill width half maximum (FWHM) of less than about 0.1 times the average wavelength of the optical radiation.

27. A method of directing electromagnetic radiation onto a data recording medium, comprising:

providing a metallic structure having an optical aperture therein, one end of the aperture receiving optical radiation and another end of the aperture emanating optical output away from the structure, the structure having a transmission resonance corresponding to a waveguide mode of the aperture;

directing optical radiation into the aperture at a frequency that matches the transmission resonance to enhance the optical output beyond what the optical output would be in the absence of the transmission resonance; and directing the optical output onto a data recording medium to facilitate the recording of data.

28. The method of claim 27, wherein the data is readable by a processor.

29. The method of claim 27, further comprising applying a magnetic field to the recording medium to write data into the recording medium.

30. The method of claim 29, comprising heating the recording medium with the optical output.

31. The method of claim 30, wherein the dimensions of the aperture are chosen to enhance, at a predetermined frequency, the optical output.

32. The method of claim 30, wherein the recording medium is granular and has a grain size on the order of between 10 and 250 cubic nanometers.

33. The method of claim 27, wherein the recording medium includes a medium selected from the group consisting of magneto-optic, phase-change, and chemical change media.

34. The method of claim 27, said directing optical output including positioning the data recording medium and the metallic structure to within a wavelength of each other, wherein the wavelength corresponds to the transmission resonance.

35. The method of claim 27, wherein the structure includes a protrusion member that directs near-field optical output onto the recording medium.

36. A method of directing electromagnetic radiation onto a recording medium, comprising:

providing a metallic structure having an optical aperture therein, the structure having a transmission resonance corresponding to a waveguide mode of the aperture;

directing optical radiation into the aperture at a frequency that matches the transmission resonance to enhance optical output propagating out of the aperture and away from the structure;

directing the optical output onto a recording medium to heat the recording medium, thereby facilitating the recording of data; and reading back the data with a processor.

37. A method of directing optical radiation onto a data recording medium, comprising:

providing a metallic structure having an optical aperture therein, the structure having dimensions selected to support optical radiation propagating in a waveguide mode of the aperture;

resonantly coupling optical radiation into the metallic structure, the optical radiation including a frequency that matches a transmission resonance of the waveguide mode; and directing optical output from the structure onto the data recording medium.

38. The method of claim 37, wherein the metallic structure adjoins at least one dielectric coating, wherein the thickness of said at least one dielectric coating is selected to enhance the optical output from the aperture.

39. The method of claim 37, wherein the optical radiation has a wavelength between 390 and 2000 nm.

40. A laser, comprising:

an optical gain medium through which optical radiation is amplified; and a first reflector and a second reflector disposed around said gain medium, wherein one of said reflectors includes:

a metallic structure having an optical aperture therein, said aperture having a first end and a second end, said first end receiving optical radiation from said medium and said second end emitting optical output, said structure having a transmission resonance corresponding to a waveguide mode of said aperture, wherein said transmission resonance is at a frequency that matches a frequency of the optical radiation, thereby enhancing the optical output from said second end beyond what the optical output would be in the absence of said resonance.

41. The laser of claim 45, further comprising a platform to which said laser is secured, wherein said platform is configured to be moved relative to a data recording medium while the separation between said structure and a surface of the data recording medium is kept to less than an average wavelength of the optical output.

42. The laser of claim 46, wherein said platform includes an air-bearing surface.

43. The laser of claim 45, further comprising at least one element secured to said laser, said at least one element generating magnetic fields whose strength is sufficient to write data in a data recording medium located within a near-field portion of the optical output.

* * * * *

UNITED STATES PATENT AND TRADEMARK OFFICE
CERTIFICATE OF CORRECTION

PATENT NO. : 6,975,580 B2 Page 1 of 1
APPLICATION NO. : 10/090589
DATED : December 13, 2005
INVENTOR(S) : Charles T. Rettner and Barry C. Stipe It is certified that error appears in the above-identified patent and that said Letters Patent is hereby corrected as shown below:

In column 19, line 12, replace "45" with -- 40 --

In column 20, line 5, replace "46" with -- 41 --

In column 20, line 7, replace "45" with -- 40 --

Signed and Sealed this

Thirtieth Day of October, 2007

JON W. DUDAS
*Director of the United States Patent and Trademark Office*